United States Patent
Wu et al.

(10) Patent No.: US 8,928,689 B2
(45) Date of Patent: *Jan. 6, 2015

(54) PIXEL DATA CONVERSION APPARATUS AND METHOD FOR DISPLAY WITH DELTA PANEL ARRANGEMENT

(71) Applicant: Orise Technology Co., Ltd., Hsinchu (TW)

(72) Inventors: Yu-Li Wu, Hsinchu (TW); Chih-Kai Chang, Taichung (TW)

(73) Assignee: Orise Technology Co., Ltd., Hsinchu (TW)

(*) Notice: Subject to any disclaimer, the term of this patent is extended or adjusted under 35 U.S.C. 154(b) by 108 days.

This patent is subject to a terminal disclaimer.

(21) Appl. No.: 13/691,886

(22) Filed: Dec. 3, 2012

(65) Prior Publication Data

US 2013/0148019 A1 Jun. 13, 2013

(30) Foreign Application Priority Data

Dec. 7, 2011 (TW) ................................. 100145165

(51) Int. Cl.
| | |
|---|---|
| G09G 5/02 | (2006.01) |
| H04N 7/01 | (2006.01) |
| G09G 5/00 | (2006.01) |
| H04N 9/64 | (2006.01) |

(52) U.S. Cl.
CPC ............. *H04N 7/0117* (2013.01); *G09G 5/005* (2013.01); *H04N 9/646* (2013.01)
USPC ........... 345/604; 345/589; 345/597; 345/600; 345/603

(58) Field of Classification Search
USPC .......................... 345/589, 597, 600, 603, 604
See application file for complete search history.

(56) References Cited

U.S. PATENT DOCUMENTS

| | | | |
|---|---|---|---|
| 7,176,940 B2 | 2/2007 | Choe et al. | |
| 7,248,234 B2 | 7/2007 | Hashimoto et al. | |
| 8,547,394 B2* | 10/2013 | Swic et al. | 345/605 |
| 8,548,063 B2* | 10/2013 | Klebanov et al. | 375/240.26 |
| 2005/0285955 A1* | 12/2005 | Utz et al. | 348/265 |

FOREIGN PATENT DOCUMENTS

| | | |
|---|---|---|
| TW | 200809761 A | 2/2008 |
| TW | I315512 B | 10/2009 |
| WO | 2007229422 A1 | 10/2007 |

* cited by examiner

*Primary Examiner* — Ke Xiao
*Assistant Examiner* — Kim-Thanh T Tran
(74) *Attorney, Agent, or Firm* — Bacon & Thomas, PLLC

(57) ABSTRACT

A pixel data conversion method for display with delta panel arrangement converts an input video signal into a temporary video signal which is a first RGB signal with 640 horizontal resolution in a strip panel arrangement and converts the temporary video signal into an output video signal which is a RGB signal with 320 horizontal resolution in the delta panel arrangement. Each line of the output video signal has 960 pixels. A pixel size ratio is defined as a ratio of a pixel size of the delta panel to a pixel size of the strip panel. The 320 horizontal resolution is obtained by dividing the 640 horizontal resolution by the pixel size ratio and then by three.

19 Claims, 13 Drawing Sheets

PIXEL DATA CONVERSION APPARATUS AND METHOD FOR DISPLAY WITH DELTA PANEL ARRANGEMENT

BACKGROUND OF THE INVENTION

1. Field of the Invention

The present invention relates to the technical field of display panels and, more particularly, to a pixel data conversion method and apparatus for display with delta panel arrangement.

2. Description of Related Art

Current consumer electronics or handheld devices are typically equipped with a liquid crystal display (LCD) panel as a human-machine interface for providing convenient viewing to a user. Generally, the LCD panels include two types, strip panels and delta panels. The strip panel is typically a large panel used in a notebook, for example. FIG. 1 is a schematic diagram of a typical strip panel. On the strip panel 100, each pixel 110, 120 has a red subpixel R, a green subpixel G, and a blue subpixel B, and the three color subpixels of each pixel generate a different brightness respectively, for being mixed into various colors.

The strip panel 100 includes multiple horizontal lines, and a display controller (not shown) provides color data to the red, green, blue subpixels R, G, B of each pixel, respectively. When the strip panel 100 has a resolution of 720×480, it indicates that the strip panel 100 has 480 horizontal lines having 720 pixels respectively, where a pixel has three color subpixels, i.e., red, green, and blue subpixels.

The strip panel 100 is based on the control of the pixel clock to concurrently receive the color data for updating the red, green, blue subpixels of a special pixel each time and further displaying different brightness respectively, so as to mix them into various colors. When all pixels of the panel are updated by controlling the scan lines in one-by-one manner, a complete frame is shown on the strip panel 100.

FIG. 2 is a timing diagram of color data and pixel clock for the strip panel 100 of FIG. 1. When an external video signal (such as an analog or digital TV video signal) is displayed by the strip panel 100, the image processing circuit (not shown) processes and samples the external video signal and further generates a pixel clock, a red data, a green data, a blue data. The red data, the green data, and the blue data are outputted by a red data line, a green data line, and a blue data line of the image processing circuit, respectively. The data sizes of the red, green, blue data can indicate a brightness of color unit respectively. Namely, the red, green, blue data corresponding to the rising edge of the first pixel clock can drive the three color subpixels of the first pixel, and the red, green, blue data corresponding to the rising edge of the second pixel clock can drive the three color subpixels of the second pixel, and so on. For an example of the strip panel 100 with a resolution of 720×480, the red, green, blue data corresponding to the first 720 pixels indicate the color data corresponding to the three color subpixels in all pixels of the first horizontal line. Similarly, after the 720×480 pixel clocks, the color units in all pixels of the entire strip panel 100 can receive a color data respectively, so the update is completed so as to display a complete image on the panel.

A small panel (such as a car display panel, a display panel used in a camera) uses a delta panel. FIG. 3 is a schematic diagram of a typical delta panel 300. For a delta panel 300, each pixel 310, 320, 330 has only one color pixel, which is surrounded by the other two color pixels, and the horizontal lines are arranged in interlacing to one another. The three color units (as indicated by a triangle in FIG. 3) consisting of a combination of three pixels generate different brightness respectively for being mixed into various colors.

When the delta panel 300 has a resolution of 320×480, also written as 320RGB×480, it indicates that the delta panel 300 has 480 horizontal lines having 960 pixels respectively. A sequence of red pixel R, green pixel G, and blue pixel B is repeatedly arranged for an odd-numbered horizontal line, and a sequence of green pixel G, blue pixel B, and red pixel R is repeatedly arranged for an even-numbered horizontal line. The position of each pixel in an even-numbered line has a half-pixel dislocation to the position of each pixel in an odd-numbered horizontal line.

If the strip panel 100 of FIG. 1 has an image to be displayed with a resolution of M×N as same as the delta panel 300 of FIG. 3, the data line signal and pixel clock generated by the image processing circuit, as shown in FIG. 2, are not suitable for the delta panel 300 of FIG. 3. Thus, a complicated control circuit has to be added between the typical image processing circuit and the delta panel 300 of FIG. 3 in order to appropriately convert the color data and pixel clock generated by the image processing circuit before sending to the delta panel 300.

According to the specification of the delta panel 300, each color unit has a respective color clock and color data line, i.e., a red clock Clk__3/R and red data line, a green clock Clk__1/G and green data line, and a blue clock Clk__2/B and blue data line. FIG. 4 is a timing diagram of color data of data lines and associated pixel clocks that are converted by a typical control circuit. Generally, the typical control circuit has a clock generator to process the pixel clock and further generate color clocks with one third of a frequency of the pixel clock that includes a red clock, a green clock, and a blue clock. As depicted in the red data, green data, blue data of FIG. 4, only one third of the M×N color data is selected and displayed. Namely, as shown in FIG. 4, the first, fourth, seventh, and tenth red data are displayed, and the time of three pixel clocks is maintained.

By comparing FIG. 2 with FIG. 4, it is known that the first RGB data is displayed, and the second RGB data and the third RGB data are not outputted for display. Similarly, the fourth, the seventh, the tenth RGB data are outputted for display, and the other RGB data are not outputted for display. When the three color clocks are at the rising edges (indicated by the arrows), the corresponding red data, green data, and blue data are displayed on the panel.

Taking the first row of pixels as an example. In the previous M pixel clocks, the rising edge of the first red clock is synchronous with the first pixel clock in order to present the first color data of the red data line at the position of the first pixel. Similarly, the rising edge of the first green clock is synchronous with the second pixel clock in order to present the first color data of the green data line at the position of the second pixel, the rising edge of the first blue clock is synchronous with the third pixel clock in order to present the first color data of the blue data line at the position of the third pixel, and so on. After the M×N pixel clocks are generated, a complete image is displayed on the entire delta panel 300.

Obviously, the typical control circuit reduces the desired resolution after the signal conversion. For example, the delta panel 300 has a resolution of M×N as same as the strip panel 100, but its actually present resolution is only one third of the strip panel. That is, some details of the desired image cannot be completely present due to the resolution reduction.

For such a problem cited above, Hung; Jui-Hung, in US Patent Publication No. 2007/0229422, described a clock duplicating circuit for receiving a pixel clock outputted by an image processing circuit to thereby generate three color clocks with a frequency of one third of the pixel clock, and the three color clocks have a duty cycle of 50%. In this case, a clock adjusting device is used to receive the three clocks generated by the clock duplicating circuit in order to adjust each of the three clocks, so that there is a phase difference of 120 degrees between every two of the clocks, and then the three adjusted clocks, i.e., a green clock Clk_1/G, a blue clock Clk_2/B, and a red clock Clk_3/R, are outputted. The color data line 31 of the image processing circuit directly acts as the color data (i.e., green, blue, red data) on the horizontal lines of the delta panel for improving the frame quality. FIG. 5 is a timing diagram of color data and associated pixel clocks for horizontal lines of a typical delta panel disclosed in the US Patent Publication No. 2007/0229422. FIG. 6 schematically illustrates a relationship of three color subpixels of the strip panel and pixels of the delta panel. As shown in the description of FIGS. 5 and 6, the color data of the strip panel 100 directly acts as the color data (i.e., green, blue, red data) of scan or horizontal lines of the delta panel 300. Namely, one of the three color subpixels at the position of a pixel of the strip panel is extracted and displayed as a pixel of the delta panel at the same position. However, such a conventional pixel data conversion does not consider that the position of each pixel in an even-numbered horizontal line has a half-pixel dislocation to the position of each pixel in an odd-numbered horizontal line, resulting in that the defects of zigzag edges, line deformation, or color fringing typically present in displaying on the delta panel. Therefore, it is desirable to provide an improved pixel data conversion to mitigate and/or obviate the aforementioned problems.

SUMMARY OF THE INVENTION

The object of the present invention is to provide a pixel data conversion method and apparatus for display with delta panel arrangement, which can avoid the problems of zigzag edges, line deformation, or color fringing that are typically present in displaying on the delta panel because the relationship between the pixel sizes of the delta panel and the strip panel is not considered, so as to effectively improve the frame quality.

In accordance with one aspect of the present invention, there is provided a pixel data conversion apparatus for display with delta panel arrangement, which comprises: a first color domain converter for converting an input video signal from an RGB domain into a YCrCb domain to generate a first YCrCb signal; a determinator connected to the first color domain converter for determining a horizontal resolution of the first YCrCb signal based on a pixel size ratio, wherein a first enable signal is generated when the first YCrCb signal is of a first horizontal resolution; a scaler connected to the determinator for scaling the first YCrCb signal to become a second YCrCb signal with a second horizontal resolution when the first enable signal is activated; a second color domain converter connected to the determinator and the scaler for converting the second YCrCb signal with the second horizontal resolution into an RGB signal with the second horizontal resolution; and a low pass filtering mapper connected to the second color domain converter for filtering and mapping the RGB signal with the second horizontal resolution into an RGB signal with a third horizontal resolution, wherein the second horizontal resolution is K times the third horizontal resolution, where K is a positive integer.

In accordance with another aspect of the present invention, there is provided a pixel data conversion method for display with delta panel arrangement, which comprises the steps of: (A) converting an input video signal from an RGB domain into a YCrCb domain so as to generate a first YCrCb signal; (B) determining a horizontal resolution of the first YCrCb signal, and generating a first enable signal when the first YCrCb signal is of a first horizontal resolution; (C) scaling the first YCrCb signal to become a second YCrCb signal with a second horizontal resolution when the first enable signal is activated; (D) converting the second YCrCb signal with the second horizontal resolution into an RGB signal with the second horizontal resolution, wherein the RGB signal with the second horizontal resolution is in a strip panel arrangement with a resolution of 640RGB×480 and has 480 horizontal lines in one frame, with 640 pixels in each horizontal line and three subpixels in each pixel, which are red, green, and blue subpixels; and (E) filtering and mapping the RGB signal with the second horizontal resolution into an RGB signal with a third horizontal resolution, wherein the RGB signal with the third horizontal resolution is in a delta panel arrangement with a resolution of 320RGB×480 and has 480 horizontal lines in one frame, with 960 pixels in each horizontal line, repeatedly arranged in a sequence of red, green, blue pixels for each odd-numbered horizontal line and in a sequence of green, blue, red pixels for each even-numbered horizontal line, wherein a position of each pixel in an even-numbered horizontal line has a half-pixel dislocation to a position of each pixel in an odd-numbered horizontal line.

Other objects, advantages, and novel features of the invention will become more apparent from the following detailed description when taken in conjunction with the accompanying drawings.

DETAILED DESCRIPTION OF THE PREFERRED EMBODIMENT

Figure 7:
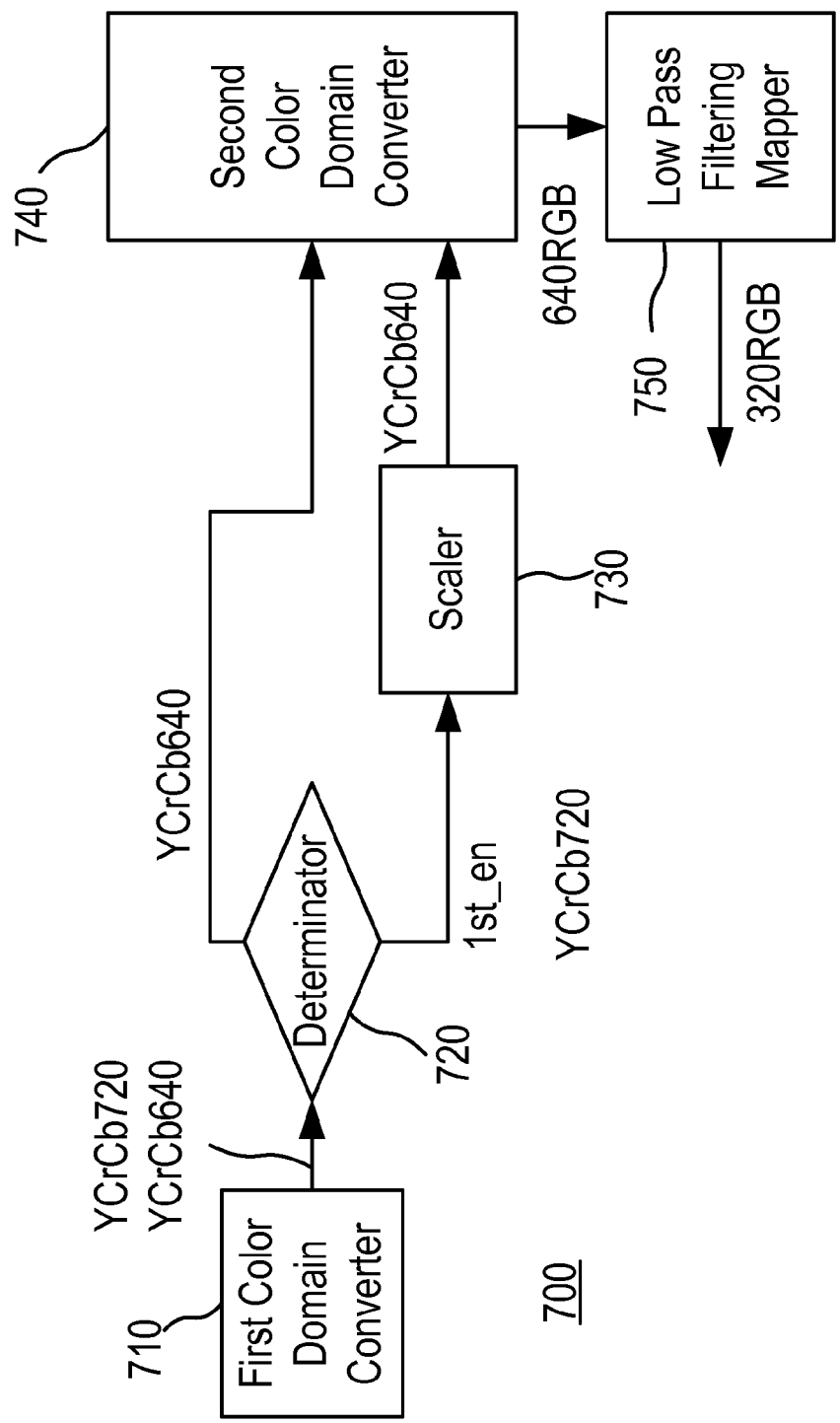
FIG. 7 is a block diagram of a pixel data conversion apparatus for displaying with a delta panel arrangement according to an embodiment of the invention.

FIG. 7 is a block diagram of a pixel data conversion apparatus 700 for display with delta panel arrangement according to an embodiment of the invention. In FIG. 7, the apparatus 700 includes a first color domain converter 710, a determinator 720, a scaler 730, a second color domain converter 740, and a low pass filtering (LPF) mapper 750.

The first color domain converter 710 converts an input video signal from an RGB domain into a YCrCb domain so as to generate a first YCrCb signal. In this application, the input video signal is described in an example of 720RGB×480 and 640RGB×480, and those who skilled in the art can develop other input video signal formats based on the description of the present invention.

When the input video signal is 720RGB×480, the first YCrCb signal outputted by the first color domain converter can be a 4:4:4 format (720YCrCb444 format) or a 4:2:2 format (720YCrCb422 format). When the input video signal is 640RGB×480, the first YCrCb signal outputted by the first color domain converter 710 can be a 4:4:4 format (640YCrCb444 format) or a 4:2:2 format (640YCrCb422 format).

The determinator 720 is connected to the first color domain converter 710 in order to determine a second horizontal resolution (640), which is the optimal to pass the low pass filtering mapper 750, based on a relationship between pixel sizes of delta and strip panels. When the first YCrCb signal is a first horizontal resolution (720), a first enable signal 1st_en is generated.

The scaler 730 is connected to the determinator 720 in order to scale the first YCrCb signal to become a second YCrCb signal YCrCb640 with a second horizontal resolution (640) when the first enable signal is activated (true) to indicate that the first horizontal resolution is not equal to the second horizontal resolution determined by the determinator. The second YCrCb signal YCrCb640 with the second horizontal resolution (640) can be 4:4:4 or 4:2:2 format.

Figure 8:
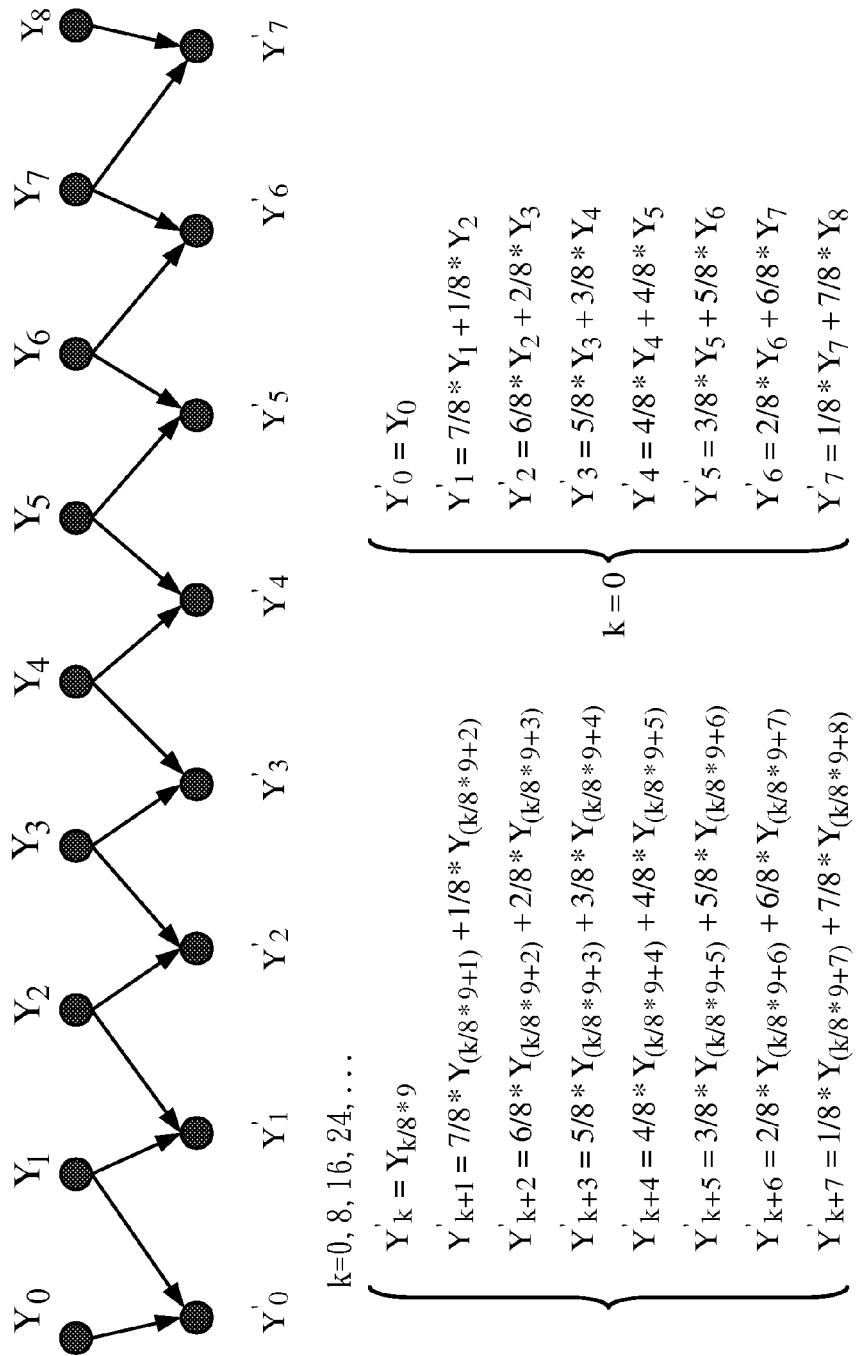
FIG. 8 is a schematic diagram of generating a luma by a scaler according to an embodiment of the invention.

When the first YCrCb signal is in the first horizontal resolution (720), the scaler 730 is enabled. FIG. 8 is a schematic diagram of generating a luma Y by the scaler 730 when the first YCrCb signal YCrCb720 is in the 4:4:4 format. In this case, the scaler 730 can be expressed by the equations as follows:

$Y'_k = Y_{k/8*9}$, $Y'_{k+1} = \frac{7}{8}*Y_{(k/8*9+1)} + \frac{1}{8}*Y_{(k/8*9+2)}$, $Y'_{k+2} = \frac{6}{8}*Y_{(k/8*9+2)} + \frac{2}{8}*Y_{(k/8*9+3)}$, $Y'_{k+3} = \frac{5}{8}*Y_{(k-8*9+3)} + \frac{3}{8}*Y_{(k/8*9+4)}$, $Y'_{k+4} = \frac{4}{8}*Y_{(k/8*9+4)} + \frac{4}{8}*Y_{(k/8*9+5)}$, $Y'_{k+5} + \frac{3}{8}*Y_{(k/8*9+5)} + \frac{5}{8}*Y_{(k/8*9+6)}$, $Y'_{k+6} = \frac{2}{8}*Y_{(k/8*9+6)} + \frac{6}{8}*Y_{(k/8*9+7)}$, and $Y'_{k+7} = \frac{1}{8}*Y_{(k/8*9+7)} + \frac{7}{8}*Y_{(k/8*9+8)}$, where k is eight times an integer, preferably k=0, 8, 16, 24, . . . ; $Y_{k/8*9}$, $Y_{(Y_{k/8*9}+1)}$, $Y_{(Y_{k/8*9}+2)}$, $Y_{(Y_{k/8*9}+3)}$, $Y_{(Y_{k/8*9}+4)}$, $Y_{(Y_{k/8*9}+5)}$, $Y_{(Y_{k/8*9}+6)}$, $Y_{(Y_{k/8*9}+7)}$, $Y_{(Y_{k/8*9}+8)}$ are lumas of the first YCrCb signal; $Y'_k$, $Y'_{k+1}$, $Y'_{k+2}$, $Y'_{k+3}$, $Y'_{k+4}$, $Y'_{k+5}$, $Y'_{k+6}$, $Y'_{k+7}$ are lumas of the second YCrCb signal with the second horizontal resolution (640).

Figure 9:
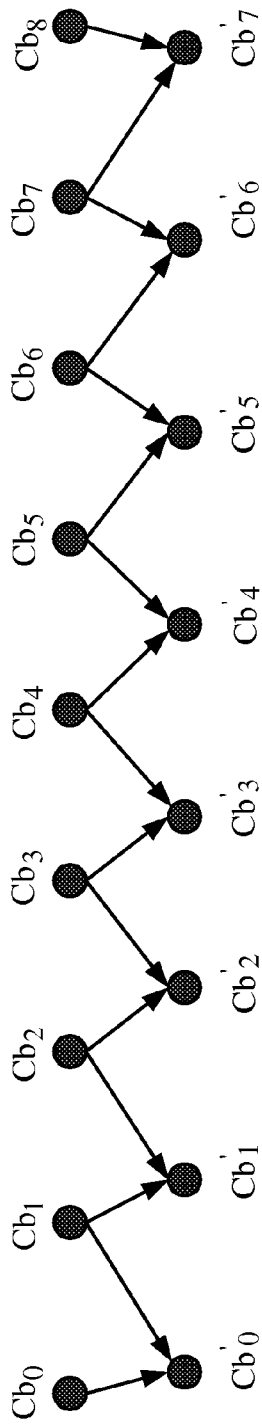
FIG. 9 is a schematic diagram of generating chromas by the scaler of FIG. 8 according to an embodiment of the invention.

FIG. 9 is a schematic diagram of generating chromas Cr, Cb by the scaler 730 when the first YCrCb signal is in the 4:4:4 format. For example, for the chroma Cb, the scaler 730 can be expressed by the equations as follows:

$Cb'_k = Cb_{k/8*9}$, $Cb'_{k+1} = \frac{7}{8}*Cb_{(k/8*9+1)} + \frac{1}{8}*Cb_{(k/8*9+2)}$, $Cb'_{k+2} = \frac{6}{8}*Cb_{(k/8*9+2)} + \frac{2}{8}*Cb_{(k/8*9+3)}$, $Cb'_{k+3} = \frac{5}{8}*Cb_{(k/8*9+3)} + \frac{3}{8}*Cb_{(k/8*9+4)}$, $Cb'_{k+4} = \frac{4}{8}*Cb_{(k/8*9+4)} + \frac{4}{8}*Cb_{(k/8*9+)}$, $Cb'_{k+5} = \frac{3}{8}*Cb_{(k/8*9+5)} + \frac{5}{8}*Cb_{(k/8*9+6)}$, $Cb'_{k+6} = \frac{2}{8}*Cb_{(k/8*9+6)} + \frac{6}{8}*Cb_{(k/8*9+7)}$, and $Cb'_{k+7} = \frac{1}{8}*Cb_{(k/8*9+7)} + \frac{7}{8}*Cb_{(k/8*9+8)}$, where k is eight times an integer; $Cb_{k/8*9}$, $Cb_{(Y_{k/8*9}+1)}$, $Cb_{(Y_{k/8*9}+2)}$, $Cb_{(Y_{k/8*9}+3)}$, $Cb_{(Y_{k/8*9}+4)}$, $Cb_{(Y_{k/8*9}+5)}$, $Cb_{(Y_{k/8*9}+6)}$, $Cb_{(Y_{k/8*9}+7)}$, $Cb_{(Y_{k/8*9}+8)}$, are chromas of the first YCrCb signal; $Cb'_k$, $Cb'_{k+1}$, $Cb'_{k+2}$, $Cb'_{k+3}$, $Cb'_{k+4}$, $Cb'_{k+5}$, $Cb'_{k+6}$, $Cb'_{k+7}$ are chromas of the second YCrCb signal with the second horizontal resolution. In addition, for the chroma Cr, the scaler 730 can be expressed by the equations as follows:

$Cr'_k = Cr_{k/8*9}$, $Cr'_{k+1} = \frac{7}{8}*Cr_{(k/8*9+1)} + \frac{1}{8}*Cr_{(k/8*9+2)}$, $Cr'_{k+2} = \frac{6}{8}*Cr_{(k/8*9+2)} + \frac{2}{8}*Cr_{(k/8*9+3)}$, $Cr'_{k+3} = \frac{5}{8}*Cr_{(k/8*9+3)} + \frac{3}{8}*Cr_{(k/8*9+4)}$, $Cr'_{k+4} = \frac{4}{8}*Cr_{(k/8*9+4)} + \frac{4}{8}*Cr_{(k/8*9+5)}$, $Cr'_{k+5} = \frac{3}{8}*Cr_{(k/8*9+5)} + \frac{5}{8}*Cr_{(k/8*9+6)}$, $Cr'_{k+6} = \frac{2}{8}*Cr_{(k/8*9+6)} + \frac{6}{8}*Cr_{(k/8*9+7)}$, and $Cr'_{k+7} = \frac{1}{8}*Cr_{(k/8*9+7)} + \frac{7}{8}*Cr_{(k/8*9+8)}$, where k is eight times an integer; $Cr_{k/8*9}$, $Cr_{(Y_{k/8*9}+1)}$, $Cr_{(Y_{k/8*9}+2)}$, $Cr_{(Y_{k/8*9}+3)}$, $Cr_{(Y_{k/8*9}+4)}$, $Cr_{(Y_{k/8*9}+5)}$, $Cr_{(Y_{k/8*9}+6)}$, $Cr_{(Y_{k/8*9}+7)}$, $Cr_{(Y_{k/8*9}+8)}$ are chromas of the first YCrCb signal; $Cr'_k$, $Cr'_{k+1}$, $Cr'_{k+2}$, $Cr'_{k+3}$, $Cr'_{k+4}$, $Cr'_{k+5}$, $Cr'_{k+6}$, $Cr'_{k+7}$ are chromas of the second YCrCb signal with the second horizontal resolution.

When the first YCrCb signal is in the 4:2:2 format, the lumas Y and the chromas Cr, Cb can be generated from the equations used in FIGS. 8 and 9, except that the first YCrCb signal has a chroma expressed by a general equation $Cb_{2*w} = Cb_{2*w+1}$, where w is an integer and w≥0, i.e., $Cb_0 = Cb_1$, $Cb_2 = Cb_3$, . . . , $Cb_{718} = Cb_{719}$, and so on. Likewise, the chroma Cr, which is expressed as $Cr_{2*w} = Cr_{2*w+1}$ similar to the chroma Cb, can be obtained from the equations used in FIGS. 8 and 9 by those who skilled in the art, and thus a detailed description is deemed unnecessary.

When the first enable signal 1st_en is true (activated), the second YCrCb signal YCrCb640 with the second horizontal resolution (640) generated by the scaler 730 is as same as the first YCrCb signal YCrCb640 outputted by the first color domain converter. Namely, when the input video signal is the first horizontal resolution (720), the scaler 730 is enabled. When the input video signal is the second horizontal resolution (640), the first color domain converter 710 outputs the first YCrCb signal YCrCb640 directly to the second color domain converter 740.

The second color domain converter 740 is connected to the scaler 730 and the determinator 730 in order to convert the second YCrCb signal YCrCb640 with the second horizontal resolution (640) into an RGB signal 640RGB with the second horizontal resolution (640).

The RGB signal 640RGB with the second horizontal resolution is in a strip panel arrangement with a resolution of 640RGB×480. One frame of the RGB signal 640RGB with the second horizontal resolution has 480 horizontal lines, and there are 640 pixels in each horizontal line and three subpixels in each pixel. The three subpixels include a red Subpixel®, a green subpixel (G), and a blue subpixel (B).

The low pass filtering mapper 750 is connected to the second color domain converter 740 in order to map the RGB signal 640RGB with the second horizontal resolution into an RGB signal 320RGB with a third horizontal resolution. The second horizontal resolution is a double of the third horizontal resolution.

The RGB signal 320RGB with the third horizontal resolution is in a delta panel arrangement with a resolution of 320RGB×480. One frame of the RGB signal 320RGB with the third horizontal resolution has 480 horizontal lines, and there are 960 pixels in each horizontal line, wherein each odd-numbered horizontal line is arranged in a sequence of red (R), green (G), blue (B) pixels repeatedly, and each even-numbered horizontal line is arranged in a sequence of green (G), blue (B), red (R) pixels repeatedly. The position of each pixel in an even-numbered horizontal line has a half-pixel dislocation to the position of each pixel in an odd-numbered horizontal line.

The pixel size of the delta panel is two thirds times the pixel size of the strip panel. A pixel size ratio η is defined as a ratio of a pixel size of the delta panel to a pixel size of the strip panel, and therefore η=⅔ in this case.

The determinator 720 is based on the pixel size ratio η to find a relationship between the second horizontal resolution (640) and the third horizontal resolution (320). The second horizontal resolution (640) is obtained from the third horizontal resolution (320) multiplied by the pixel size ratio η and further multiplied by three, i.e., 640=320×(η)×3=320×(⅔)× 3=320×2=320×K. Thus, the second horizontal resolution (640) is K times the third horizontal resolution (320), where K=2.

Figure 10:
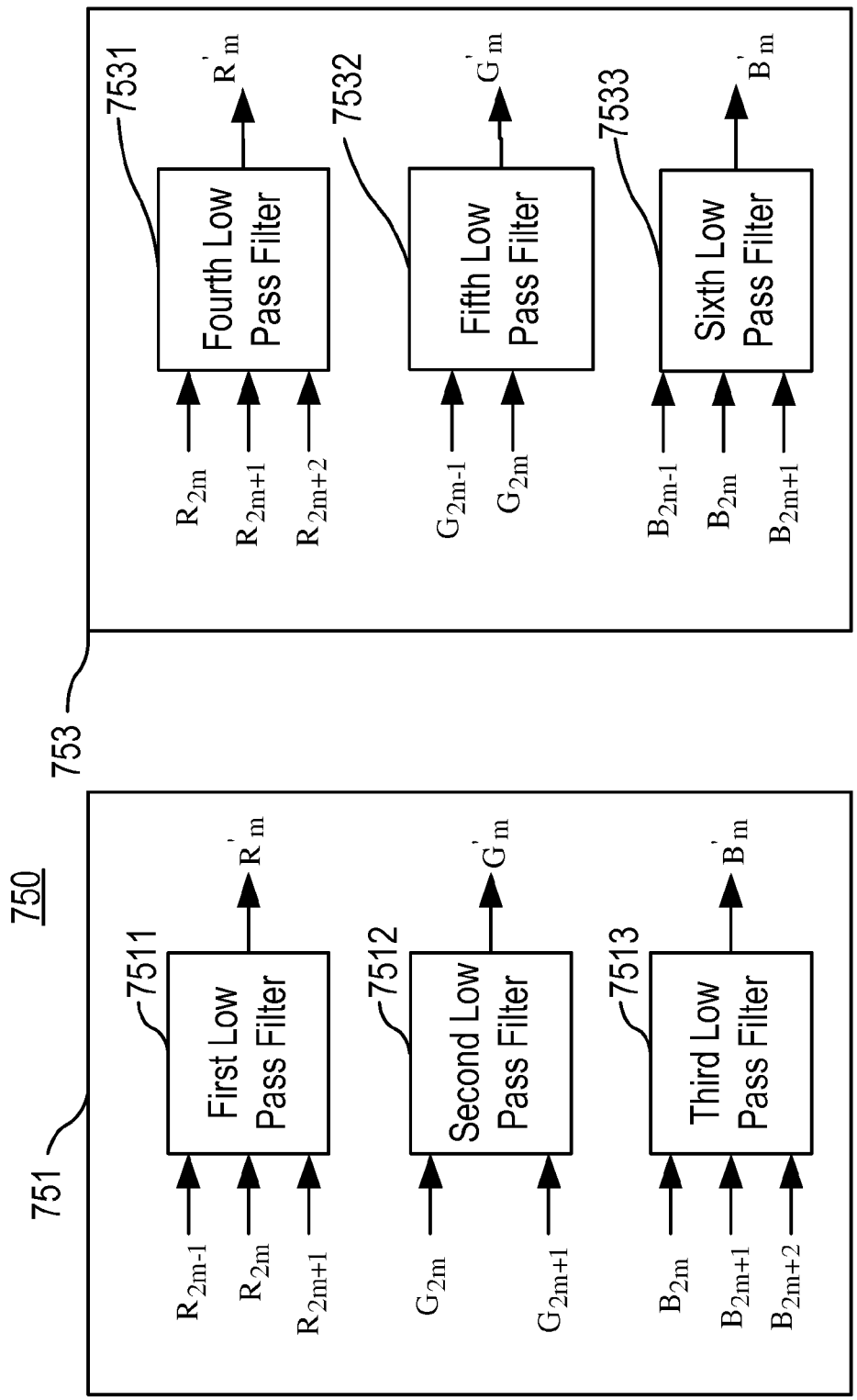
FIG. 10 is a block diagram of a low pass filtering mapper according to an embodiment of the invention.

FIG. 10 is a block diagram of the low pass filtering (LPF) mapper 750 according to an embodiment of the invention. The low pass filtering mapper 750 includes an odd horizontal line LPF mapper 751 and an even horizontal line LPF mapper 753.

The odd horizontal line LPF mapper 751 receives the odd-numbered horizontal lines of the RGB signal 640RGB with the third horizontal resolution and performs a low pass filtering and mapping on the odd-numbered horizontal lines to thereby generate the odd-numbered horizontal lines of an RGB signal 320RGB with the third horizontal resolution.

The even horizontal line LPF mapper 753 receives the even-numbered horizontal lines of the RGB signal 640RGB with the third horizontal resolution and performs a low pass filtering and mapping on the even-numbered horizontal lines to thereby generate the even-numbered horizontal lines of the RGB signal 320RGB with the third horizontal resolution.

The odd horizontal line LPF mapper 751 includes a first low pass filter 7511, a second low pass filter 7512, and a third low pass filter 7513. The first low pass filter 7511 performs a low pass filtering based on three pixels of each odd-numbered horizontal line of the RGB signal 640RGB with the second horizontal resolution to thereby generate red pixels of the odd-numbered horizontal line of the RGB signal 320RGB with the third horizontal resolution. The first low pass filter 7513 performs a low pass filtering based on three pixels of each odd-numbered horizontal line of the RGB signal 640RGB with the second horizontal resolution to thereby generate blue pixels of the odd-numbered horizontal line of the RGB signal 320RGB with the third horizontal resolution. The first low pass filter 7512 performs a low pass filtering based on two pixels of each odd-numbered horizontal line of the RGB signal 640RGB with the second horizontal resolution to thereby generate green pixels of the odd-numbered horizontal line of the RGB signal 320RGB with the third horizontal resolution.

The first low pass filter 7511 can be expressed by the following equation:

$$R'_m = \alpha_1 \times R_{(m*2-1)} + \beta_1 \times R_{m*2} + \gamma_1 \times R_{(m*2+1)},$$

where m is an integer; $R'_m$ indicates a red pixel of the odd-numbered horizontal line of the RGB signal 320RGB with the third horizontal resolution; $R_{(m*2-1)}$, $R_{m*2}$, $R_{(m*2+1)}$ indicate respective red subpixels of the three pixels of the odd-numbered horizontal line of the RGB signal 640RGB with the second horizontal resolution; $\alpha_1$, $\beta_1$, $\gamma_1$ indicate coefficients of the first low pass filter 7511 corresponding to the red subpixels, respectively. The second low pass filter 7512 can be expressed by the following equation:

$$G'_m = \alpha_2 \times G_{(m*2)} + \beta_2 \times G_{(m*2+1)},$$

where $G'_m$ indicates a green pixel of the odd-numbered horizontal line of the RGB signal 320RGB with the third horizontal resolution; $G_{(m*2)}$, $G_{(m*2+1)}$ indicate respective green subpixels of the two pixels of the odd-numbered horizontal line of the RGB signal 640RGB with the second horizontal resolution; $\alpha_2$, $\beta_2$ indicate coefficients of the second low pass filter 7512 corresponding to the green subpixels, respectively. The third low pass filter 7513 can be expressed by the following equation:

$$B'_m = \alpha_1 \times B_{(m*2)} + \beta_1 \times B_{(m*2+1)} + \gamma_1 \times B_{(m*2+2)},$$

where $B'_m$ indicates a blue pixel of the odd-numbered horizontal line of the RGB signal 320RGB with the third horizontal resolution; $B_{(m*2)}$, $B_{(m*2+1)}$, $B_{(m*2+2)}$ indicate respective blue subpixels of the three pixels of the odd-numbered horizontal line of the RGB signal 640RGB with the second horizontal resolution; $\alpha_1$, $\beta_1$, $\gamma_1$ indicate coefficients of the third low pass filter 7513 corresponding to the blue subpixels, respectively.

The even horizontal line LPF mapper 753 includes a fourth low pass filter 7531, a fifth low pass filter 7532, and a sixth low pass filter 7533. The fourth low pass filter 7531 performs a low pass filtering based on three pixels of each even-numbered horizontal line from the RGB signal 640RGB with the second horizontal resolution to thereby generate red pixels of the even-numbered horizontal line of the RGB signal 320RGB with the third horizontal resolution. The sixth low pass filter 7533 performs a low pass filtering based on three pixels of the even-numbered horizontal line from the RGB signal 640RGB with the second horizontal resolution to thereby generate blue pixels of the even-numbered horizontal line of the RGB signal 320RGB with the third horizontal resolution. The fifth low pass filter 7532 performs a low pass filtering based on two pixels of the even-numbered horizontal line of the RGB signal 640RGB with the second horizontal resolution to thereby generate green pixels of the even-numbered horizontal line of the RGB signal 320RGB with the third horizontal resolution.

The fourth low pass filter 7531 can be expressed by the following equation:

$$R'_m = \alpha_1 \times R_{(m*2)} + \beta_1 \times R_{(m*2+1)} + \gamma_1 \times R_{(m*2+2)},$$

where m is an integer; $R'_m$ indicates a red pixel of the even-numbered horizontal line of the RGB signal 320RGB with the third horizontal resolution; $R_{(m*2)}$, $R_{(m*2+1)}$, $R_{(m*2+2)}$ indicate respective red subpixels of the three pixels of the even-numbered horizontal line from the RGB signal 640RGB with the second horizontal resolution; $\alpha_1$, $\beta_1$, $\gamma_1$ indicate coefficients of the fourth low pass filter 7531 corresponding to the red subpixels, respectively. The fifth low pass filter 7532 can be expressed by the following equation:

$$G'_m = \alpha_2 \times G_{(m*2-1)} + \beta_2 \times G_{(m*2)},$$

where $G'_m$ indicates a green pixel of the even-numbered horizontal line of the RGB signal 320RGB with the third horizontal resolution; $G_{(m*2-1)}$, $G_{(m*2)}$ indicate respective green subpixels of the two pixels of the even-numbered horizontal line from the RGB signal 640RGB with the second horizontal resolution; $\alpha_2$, $\beta_2$ indicate coefficients of the fifth low pass filter 7532 corresponding to the green subpixels, respectively. The sixth low pass filter 7533 can be expressed by the following equation:

$$B'_m = \alpha_1 \times B_{(m*2-1)} + \beta_1 \times B_{(m*2)} + \gamma_1 \times B_{(m*2+1)},$$

where $B'_m$ indicates a blue pixel of the even-numbered horizontal line of the RGB signal 320RGB with the third horizontal resolution; $B_{(m*2-1)}$, $B_{(m*2)}$, $B_{(m*2+1)}$ indicate respective blue subpixels of the three pixels of the even-numbered horizontal line from the RGB signal 640RGB with the second horizontal resolution; $\alpha_1$, $\beta_1$, $\gamma_1$ indicate coefficients of the sixth low pass filter 7533 corresponding to the blue subpixels, respectively.

Figure 11:
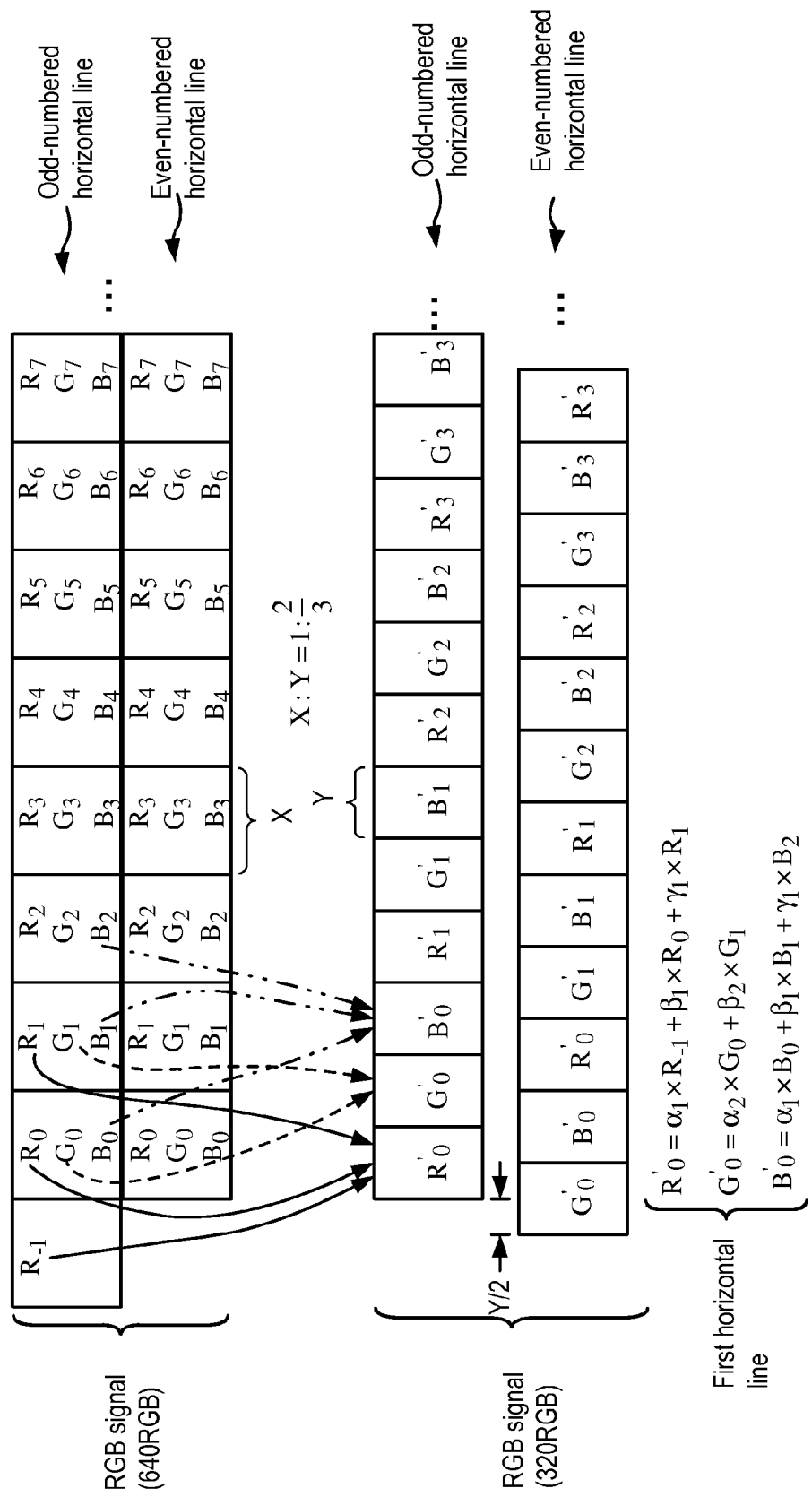
FIG. 11 is a schematic diagram of an operation of an odd horizontal line low pass filtering mapper according to an embodiment of the invention.

FIG. 11 is a schematic diagram of an operation of the odd horizontal line low pass filtering mapper 751 according to an embodiment of the invention. As shown in FIG. 11, the odd horizontal line low pass filtering mapper 751 generates the pixel $R'_0$ of, for example, the first horizontal line of the RGB signal 320RGB with the third horizontal resolution (320) based on three pixels ($R_1$, $R_0$, $R_1$) of the first horizontal line of the RGB signal 640RGB with the third horizontal resolution (640), generates the pixel $G'_0$ of the odd-numbered horizontal line based on two pixels ($G_0$, $G_1$), and generates the pixel $B'_0$ of the odd-numbered horizontal line based on three pixels ($B_0$, $B_1$, $B_2$). The other odd-numbered horizontal lines can be operated as same as the first horizontal line, and when the pixel $R_{-1}$ cannot be found, the pixel $R_0$ that is closest to the pixel $R_{-1}$ is used in the operation. From FIG. 11, it is known that the pixel size of the delta panel is two third times the pixel size of the strip panel. Thus, the pixel $G'_0$ locates between the pixels $G_0$, $G_1$, and the second low pass filter 7512 generates the pixel $G'_0$ based on the pixels $G_0$, $G_1$. The pixel $G'_0$ generated in the invention is more accurate than that in the prior art since the ratio relationship between the pixel size of the delta panel and the pixel size of the strip panel is considered.

Figure 12:
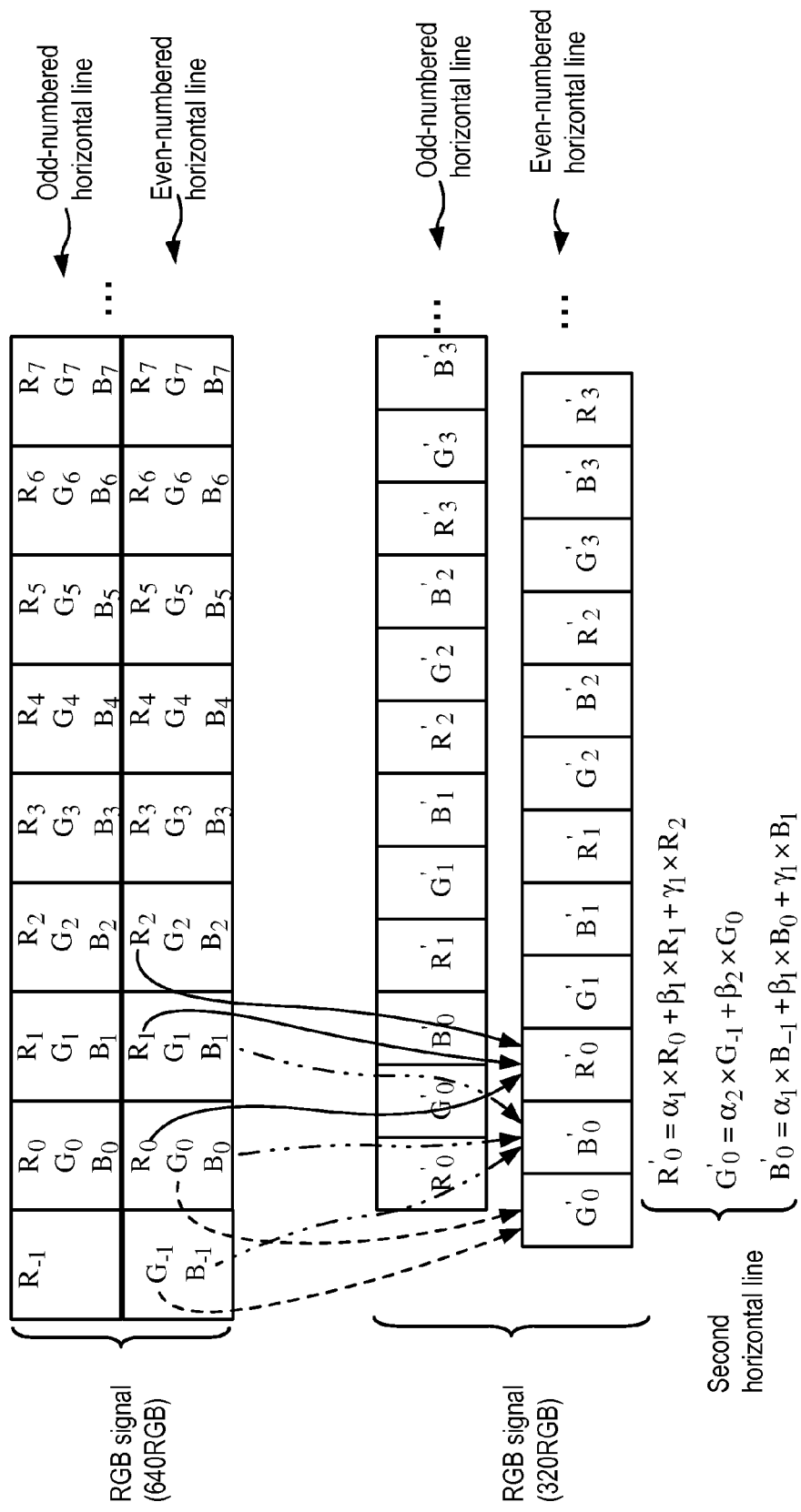
FIG. 12 is a schematic diagram of an operation of an even horizontal line low pass filtering mapper according to an embodiment of the invention.

FIG. 12 is a schematic diagram of an operation of the even horizontal line low pass filtering mapper 753 according to an embodiment of the invention. As shown in FIG. 12, the even horizontal line low pass filtering mapper 753 generates the pixel $R'_0$ of the second horizontal line from the RGB signal 320RGB with the third horizontal resolution (320) based on three pixels ($R_0$, $R_1$, $R_2$) of, for example, the second horizontal line from the RGB signal 640RGB with the second horizontal resolution (640), generates the pixel $G'_0$ of the even-numbered horizontal line based on two pixels ($G_{-1}$, $G_0$), and generates the pixel $B'_0$ of the even-numbered horizontal line based on three pixels ($B_{-1}$, $B_0$, $B_1$). The other even-numbered horizontal lines can be operated as same as the second horizontal line, and if the pixel $G_{-1}$ cannot be found, the pixel $G_0$ that is closest to the pixel $G_{-1}$ is used in the operation. Likewise, if the pixel $B_{-1}$ cannot be found, the pixel $B_{-1}$ can be replaced with $B_0$.

Likewise, the pixel $G'_0$ locates between the pixels $G_0$, $G_{-1}$, and the fifth low pass filter 7532 generates the pixel $G'_0$ based on the pixels $G_0$, $G_{-1}$. The pixel $G'_0$ generated in the invention is more accurate than that in the prior art since the ratio relationship between the pixel size of the delta panel and the pixel size of the strip panel is considered.

Figure 1:
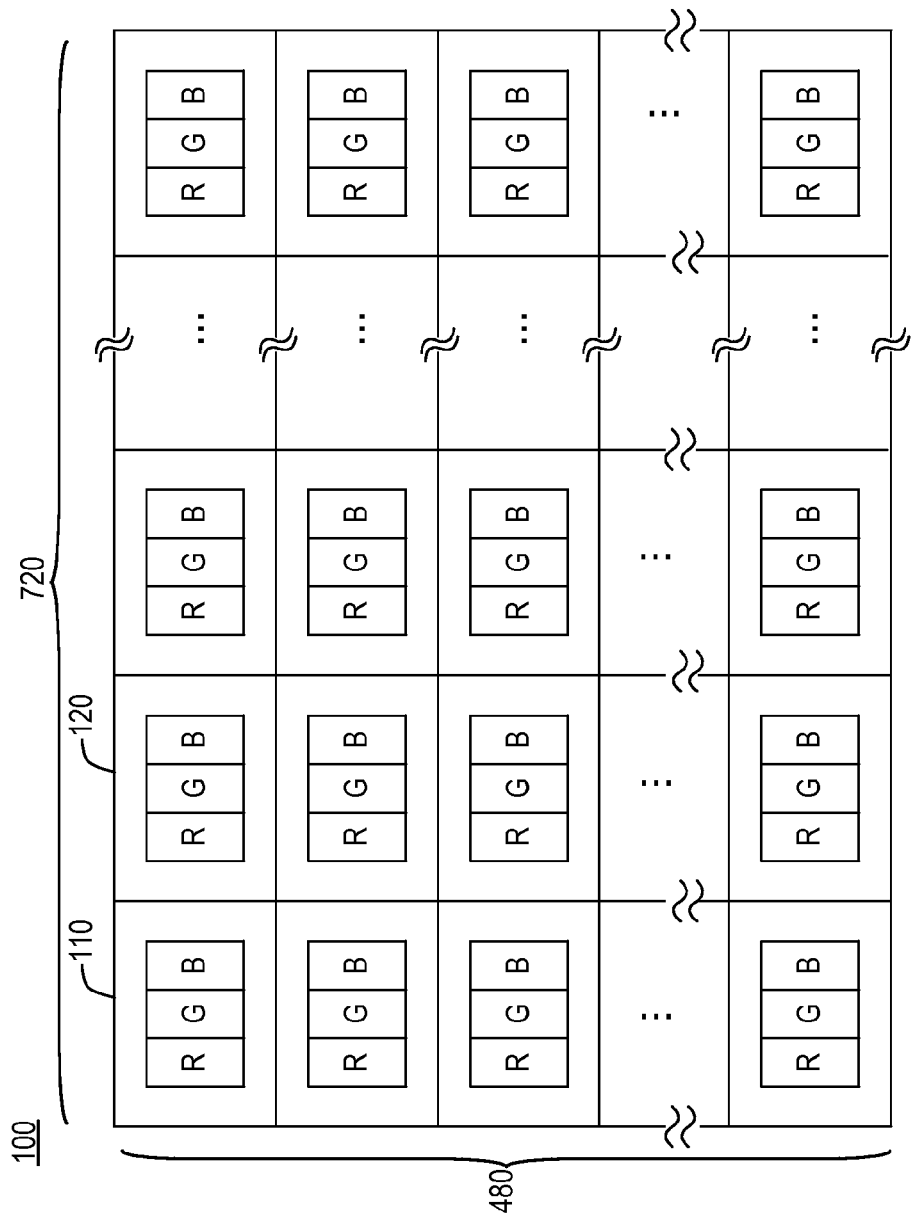
FIG. 1 is a schematic diagram of a typical strip panel.
Figure 2:
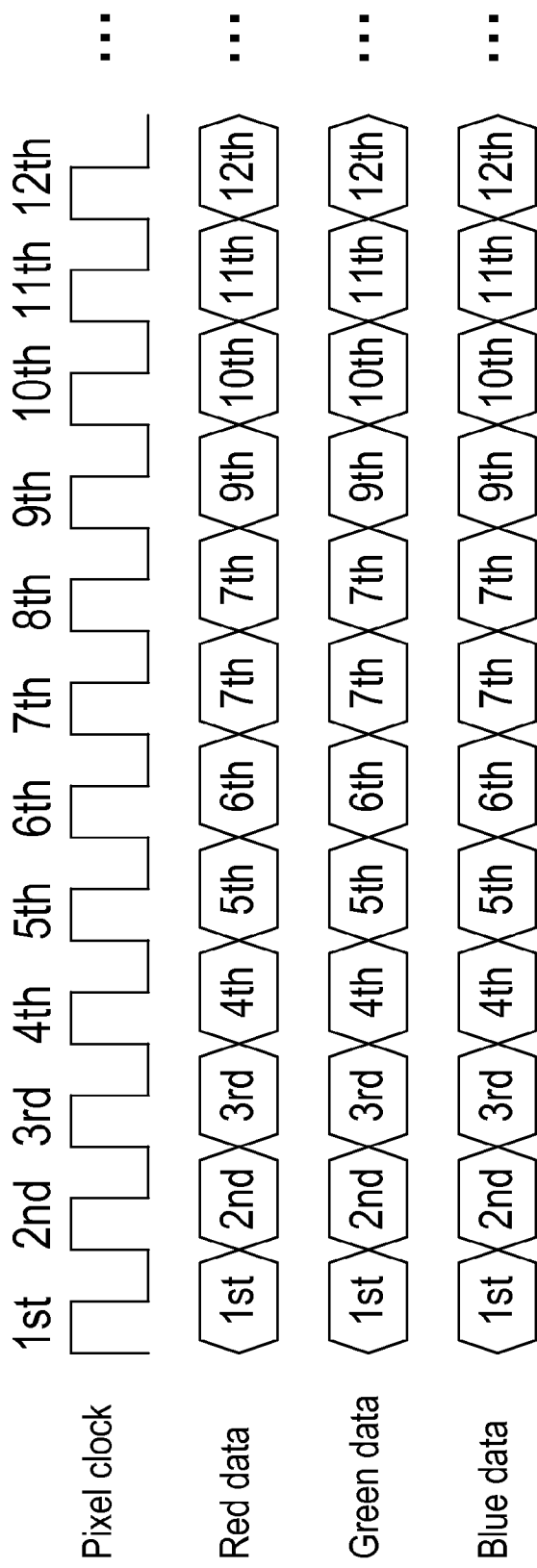
FIG. 2 is a timing diagram of color data and a pixel clock for a typical strip panel.
Figure 3:
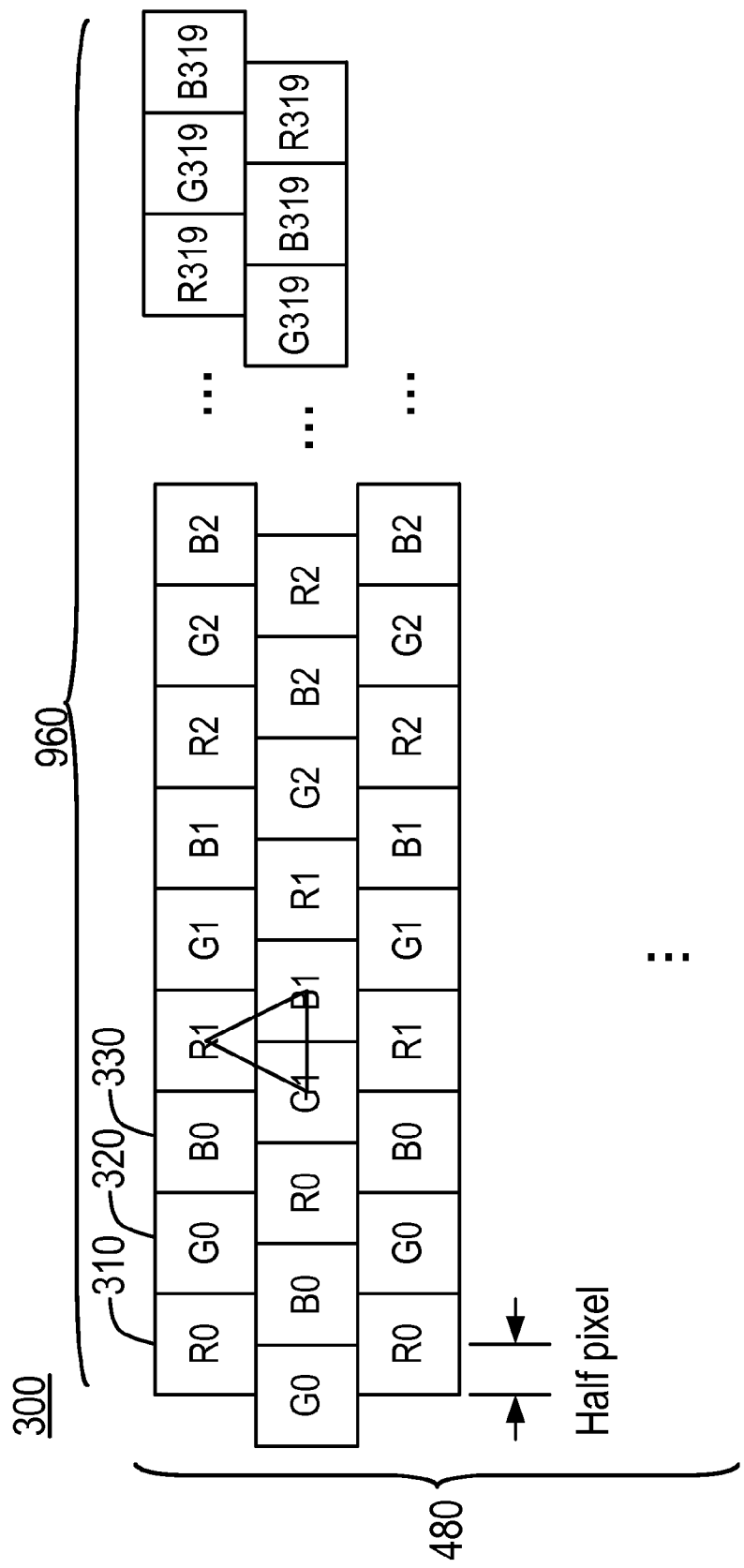
FIG. 3 is a schematic diagram of a typical delta panel.
Figure 4:
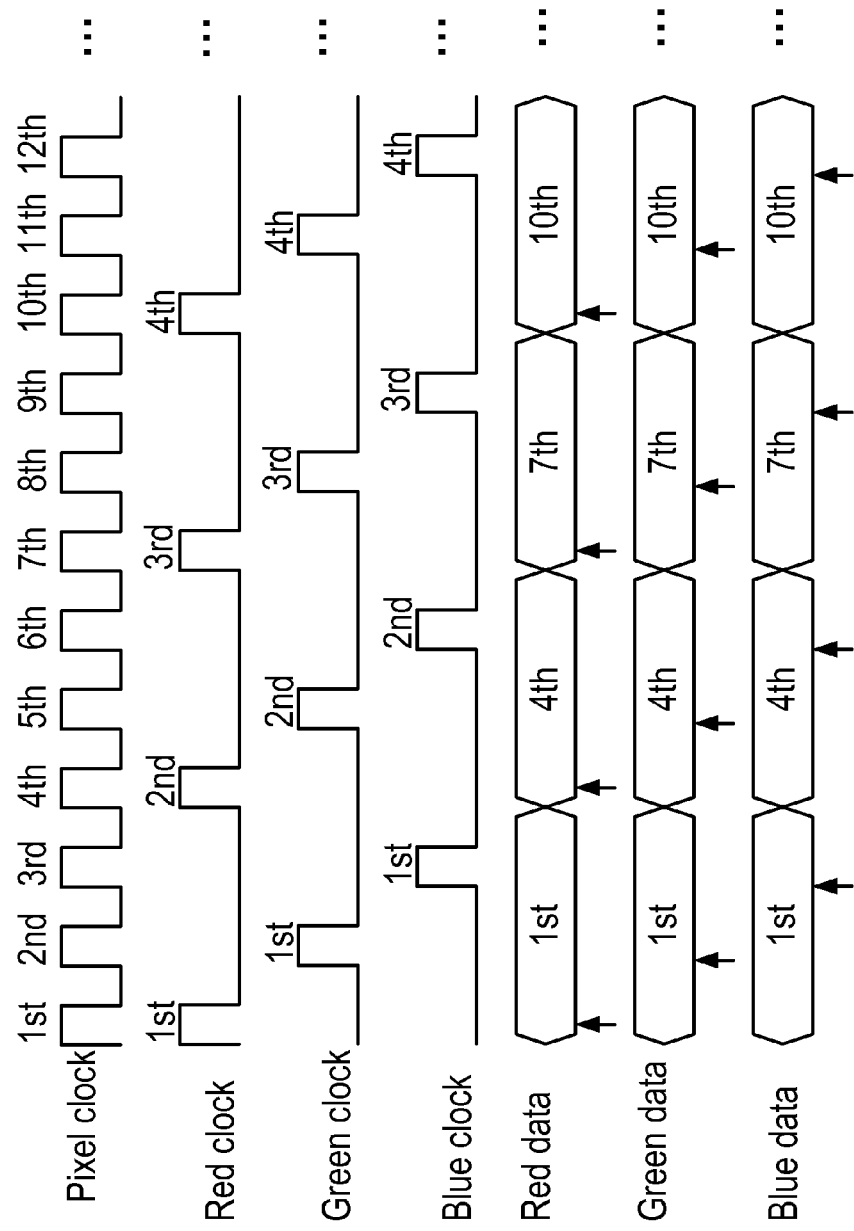
FIG. 4 is a timing diagram of color data of data lines and associated pixel clocks that are converted by a typical control circuit.
Figure 5:
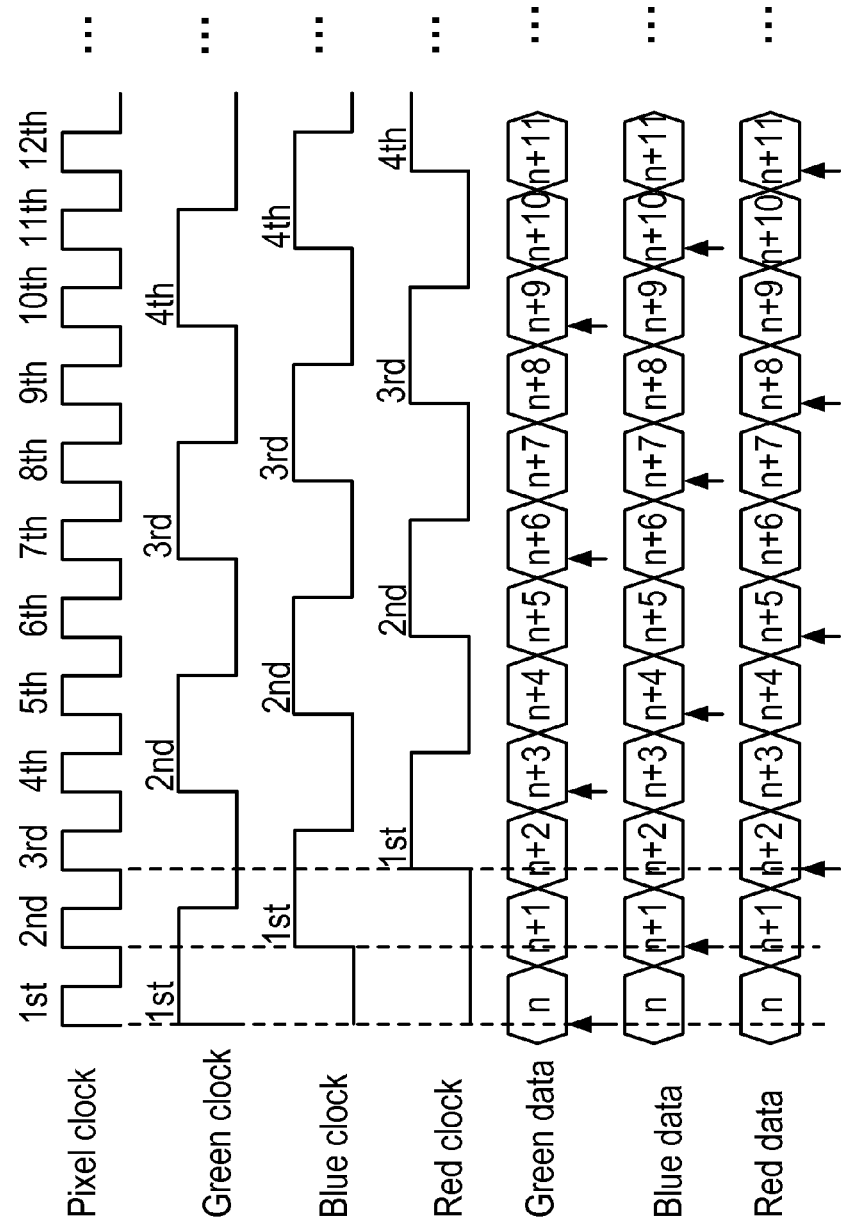
FIG. 5 is a timing diagram of color data and associated pixel clocks for horizontal lines of a typical delta panel.
Figure 6:
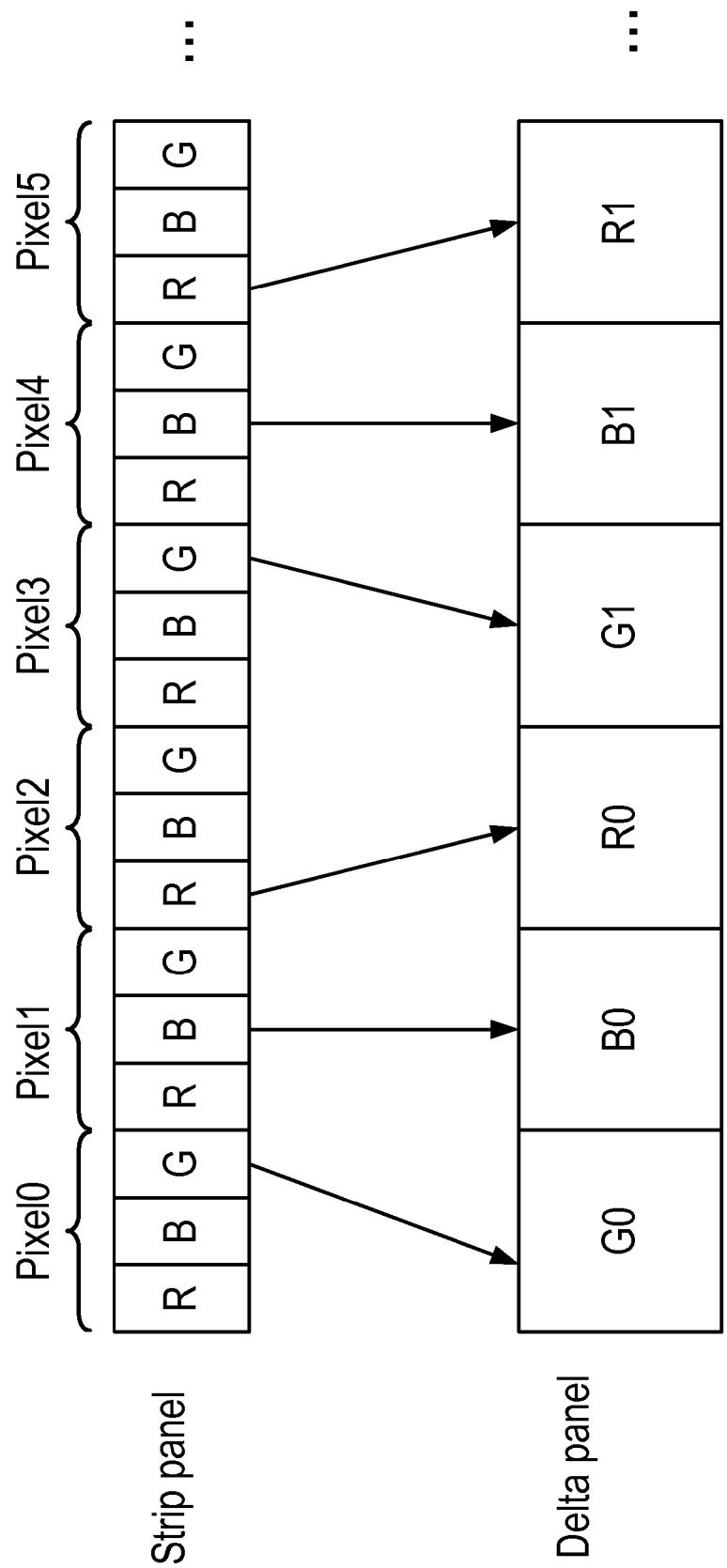
FIG. 6 schematically illustrating a relationship between three color subpixels of a typical strip panel and pixels of a typical delta panel.

By comparing FIG. 6 of the prior art with FIGS. 11 and 12 of the present invention, it is known that in the invention the LPF mapper 750 is designed to perform a low pass filtering and mapping in view of the space pixel model of delta panels and the half pixel dislocation between odd-numbered and even-numbered horizontal lines, so that the prior problems of zigzag edges, line deformation, and color fringing can be avoided when an image is displayed on a delta panel, thereby effectively improving the displayed frame quality.

Figure 13:
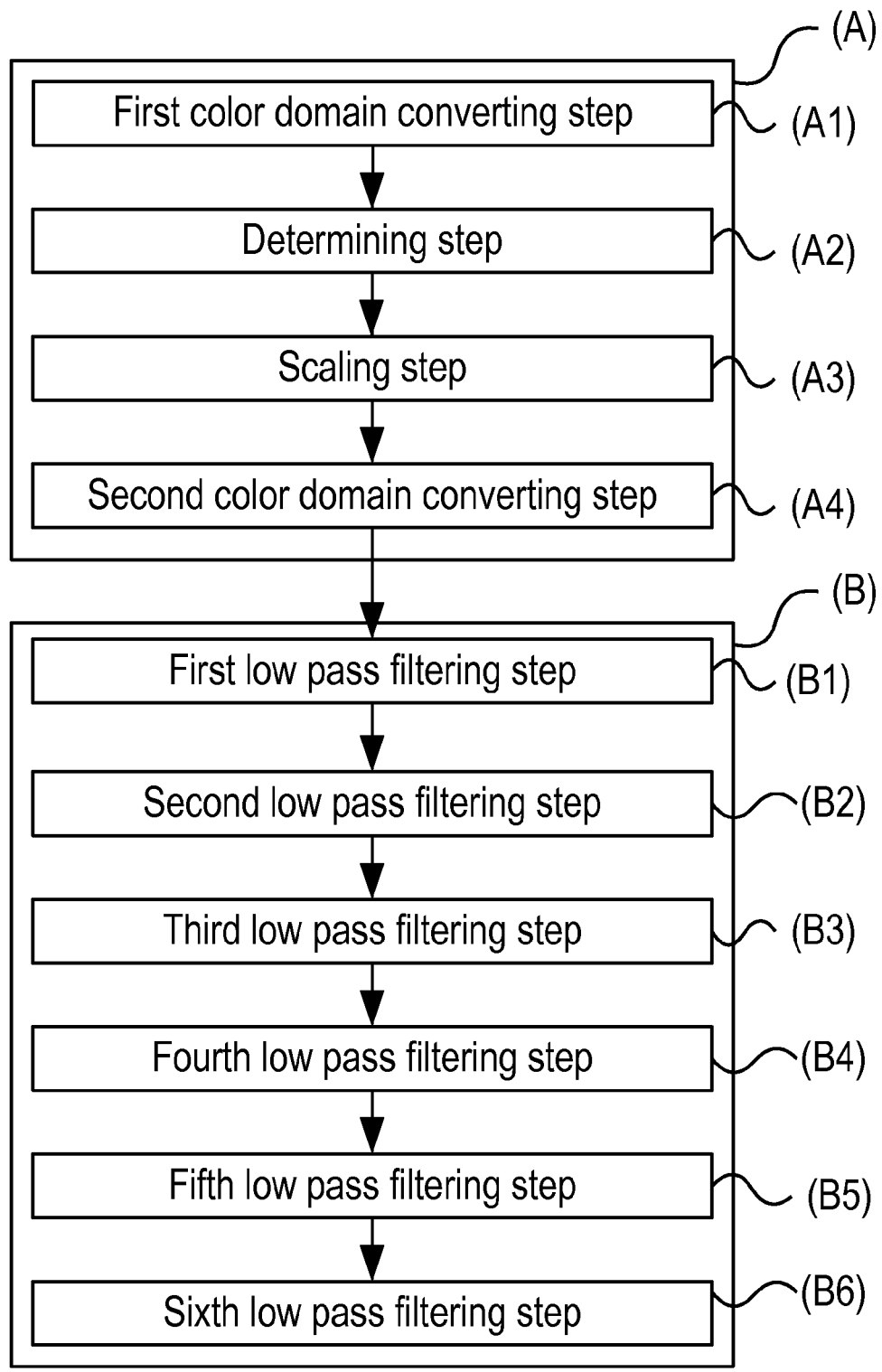
FIG. 13 is a flowchart of a pixel data conversion method for display with delta panel arrangement.

FIG. 13 is a flowchart of a pixel data conversion method for display with delta panel arrangement. As shown in FIGS. 7 and 13, step (A) converts an input video signal from an RGB domain into an RGB signal 640RGB with a second horizontal resolution (640). The RGB signal 640RGB with the second horizontal resolution (640) is in a strip panel arrangement with a resolution of 640RGB×480 and has 480 horizontal lines in one frame, with 640 pixels in each horizontal line and three subpixels in each pixel, which are red (R), green (G), and blue (B) subpixels.

Step (B) filters and maps the RGB signal 640RGB with the second horizontal resolution (640) into an RGB signal 320RGB with a third horizontal resolution (320). The RGB signal 320RGB with the third horizontal resolution (320) is in a delta panel arrangement with a resolution of 320RGB×480 and has 480 horizontal lines in one frame, with 960 pixels in each horizontal line, repeatedly arranged in a sequence of red (R), green (G), blue (B) pixels for each odd-numbered number line and in a sequence of green (G), blue (B), red (R) pixels for each even-numbered horizontal line. The position of each pixel in an evennumbered horizontal line has a half-pixel dislocation to the position of each pixel in an oddnumbered horizontal line.

Furthermore, step (A) can be divided into steps (A1)-(A5). Step (A1) performs a first color domain converting step to convert an input video signal from an RGB domain into a YCrCb domain to thereby generate a first YCrCb signal. In this embodiment, the input video signal is given with 720RGB×480 and 640RGB×480 formats as an example.

When the input video signal is in the 720RGB×480 format, the first color domain converting step outputs the first YCrCb signal with a format of 4:4:4 or 4:2:2. When the input video signal is in the 640RGB×480 format, the first color domain converting step performed by the first color domain converter 710 outputs the first YCrCb signal with a format of 4:4:4 or 4:2:2.

Step (A2) performs a determining step to determine a horizontal resolution of the first YCrCb signal. When the first YCrCb signal is a first horizontal resolution (720), a first enable signal 1st_en is generated.

Step (A3) performs a scaling step to scale the first YCrCb signal to become a second YCrCb signal YCrCb640 with a second horizontal resolution (640) when the first enable signal 1st_en is activated (true). The scaling step, as shown in FIG. 8, outputs a luma Y expressed by the equations as follows:

$$Y'_k = Y_{k/8*9},$$

$$Y'_{k+1} = \tfrac{7}{8} * Y_{(k/8*9+1)} + \tfrac{1}{8} * Y_{(k/8*9+2)},$$

$$Y'_{k+2} = \tfrac{6}{8} * Y_{(k/8*9+2)} + \tfrac{2}{8} * Y_{(k/8*9+3)},$$

$$Y'_{k+3} = 5/8 * Y_{(k/8*9+3)} + 3/8 * Y_{(k/8*9+4)},$$

$$Y'_{k+4} = 4/8 * Y_{(k/8*9+4)} + 4/8 * Y_{(k/8*9+5)},$$

$$Y'_{k+5} = 3/8 * Y_{(k/8*9+5)} + 5/8 * Y_{(k/8*9+6)},$$

$$Y'_{k+6} = 2/8 * Y_{(k/8*9+6)} + 6/8 * Y_{(k/8*9+7)}, \text{ and}$$

$$Y'_{k+7} = 1/8 * Y_{(k/8*9+7)} + 7/8 * Y_{(k/8*9+8)},$$

where k is eight times an integer, preferably k=0, 8, 16, 24, ... ; $Y_{k/8*9}$, $Y_{(Y_{k/8*9}+1)}$, $Y_{(Y_{k/8*9}+2)}$, $Y_{(Y_{k/8*9}+3)}$, $Y_{(Y_{k/8*9}+4)}$, $Y_{(Y_{k/8*9}+5)}$, $Y_{(Y_{k/8*9}+6)}$, $Y_{(Y_{k/8*9}+7)}$, $Y_{(Y_{k/8*9}+8)}$ are lumas of the first YCrCb signal; $Y'_k$, $Y'_{k+1}$, $Y'_{k+2}$, $Y'_{k+3}$, $Y'_{k+4}$, $Y'_{k+5}$, $Y'_{k+6}$, $Y'_{k+7}$ are lumas of the second YCrCb signal with the second horizontal resolution (640).

When the first YCrCb signal in the scaling step is in the 4:4:4 format, the chromas Cr, Cb can be generated with reference to FIG. 9. FIG. 9 is a schematic diagram of generating the chromas Cr, Cb by the scaler 730 when the first YCrCb signal is in the 4:4:4 format. For example, for a chroma Cb, the scaling step can be expressed by equations as follows:

$$Cb'_k = Cb_{k/8*9},$$

$$Cb'_{k+1} = 7/8 * Cb_{(k/8*9+1)} + 1/8 * Cb_{(k/8*9+2)},$$

$$Cb'_{k+2} = 6/8 * Cb_{(k/8*9+2)} + 2/8 * Cb_{(k/8*9+3)},$$

$$Cb'_{k+3} = 5/8 * Cb_{(k/8*9+3)} + 3/8 * Cb_{(k/8*9+4)},$$

$$Cb'_{k+4} = 4/8 * Cb_{(k/8*9+4)} + 4/8 * Cb_{(k/8*9+5)},$$

$$Cb'_{k+5} = 3/8 * Cb_{(k/8*9+5)} + 5/8 * Cb_{(k/8*9+6)},$$

$$Cb'_{k+6} = 2/8 * Cb_{(k/8*9+6)} + 6/8 * Cb_{(k/8*9+7)}, \text{ and}$$

$$Cb'_{k+7} = 1/8 * Cb_{(k/8*9+7)} + 7/8 * Cb_{(k/8*9+8)},$$

where k is eight times an integer; $Cb_{k/8*9}$, $Cb_{(Y_{k/8*9}+1)}$, $Cb_{(Y_{k/8*9}+2)}$, $Cb_{(Y_{k/8*9}+3)}$, $Cb_{(Y_{k/8*9}+4)}$, $Cb_{(Y_{k/8*9}+5)}$, $Cb_{(Y_{k/8*9}+6)}$, $Cb_{(Y_{k/8*9}+7)}$, $Cb_{(Y_{k/8*9}+8)}$ are chromas of the first YCrCb signal; $Cb'_k$, $Cb'_{k+1}$, $Cb'_{k+2}$, $Cb'_{k+3}$, $Cb'_{k+4}$, $Cb'_{k+5}$, $Cb'_{k+6}$, $Cb'_{k+7}$ are chromas of the second YCrCb signal with the second horizontal resolution. In addition, for a chroma Cr, the scaling step can be expressed by equations as follows:

$$Cr'_k = Cr_{k/8*9},$$

$$Cr'_{k+1} = 7/8 * Cr_{(k/8*9+1)} + 1/8 * Cr_{(k/8*9+2)},$$

$$Cr'_{k+2} = 6/8 * Cr_{(k/8*9+2)} + 2/8 * Cr_{(k/8*9+3)},$$

$$Cr'_{k+3} = 5/8 * Cr_{(k/8*9+3)} + 3/8 * Cr_{(k/8*9+4)},$$

$$Cr'_{k+4} = 4/8 * Cr_{(k/8*9+4)} + 4/8 * Cr_{(k/8*9+5)},$$

$$Cr'_{k+5} = 3/8 * Cr_{(k/8*9+5)} + 5/8 * Cr_{(k/8*9+6)},$$

$$Cr'_{k+6} = 2/8 * Cr_{(k/8*9+6)} + 6/8 * Cr_{(k/8*9+7)}, \text{ and}$$

$$Cr'_{k+7} = 1/8 * Cr_{(k/8*9+7)} + 7/8 * Cr_{(k/8*9+8)},$$

where k is eight times an integer; $Cr_{k/8*9}$, $Cr_{(Y_{k/8*9}+1)}$, $Cr_{(Y_{k/8*9}+2)}$, $Cr_{(Y_{k/8*9}+3)}$, $Cr_{(Y_{k/8*9}+4)}$, $Cr_{(Y_{k/8*9}+5)}$, $Cr_{(Y_{k/8*9}+6)}$, $Cr_{(Y_{k/8*9}+7)}$, $Cr_{(Y_{k/8*9}+8)}$, are chromas of the first YCrCb signal; $Cr'_k$, $Cr'_{k+1}$, $Cr'_{k+2}$, $Cr'_{k+3}$, $Cr'_{k+4}$, $Cr'_{k+5}$, $Cr'_{k+6}$, $Cr'_{k+7}$ are chromas of the second YCrCb signal with the second horizontal resolution.

When the first YCrCb signal is in the 4:2:2 format, the lumas Y and the chromas Cr, Cb can be obtained from the equations used in FIGS. 8 and 9, except that the first YCrCb signal has the chromas $Cb_0 = Cb_1$, $Cb_2 = Cb_3$, ... , $Cb_{718} = Cb_{719}$, and so on. Likewise, the chroma Cr can be obtained from the equations used in FIGS. 8 and 9 by those who skilled in the art, and thus a detailed description is deemed unnecessary.

Step (A4) performs a second color domain converting step to convert the second YCrCb signal YCrCb640 with the second horizontal resolution into the RGB signal 640RGB with the second horizontal resolution.

Step (B) can be divided into steps (B1)-(B6). Step (B1) performs a first low pass filtering step expressed by the equation as follows:

$$R'_m = \alpha_1 \times R_{(m*2-1)} + \beta_1 \times R_{m*2} + \gamma_1 \times R_{(m*2+1)},$$

where m is an integer; $R'_m$ indicates a red pixel of the odd-numbered horizontal line of the RGB signal 320RGB with the third horizontal resolution (320); $R_{(m*2-1)}$, $R_{m*2}$, $R_{(m*2+1)}$ indicate respective red subpixels of the three pixels of the odd-numbered horizontal line from the RGB signal 640RGB with the second horizontal resolution; $\alpha_1$, $\beta_1$, $\gamma_1$ indicate coefficients respectively corresponding to the red subpixels in the first low pass filtering step.

Step (B2) performs a second low pass filtering step expressed by the equation as follows:

$$G'_m = \alpha_2 \times G_{(m*2)} + \beta_2 \times G_{(m*2+1)},$$

where m is an integer; $G'_m$ indicates a green pixel of the odd-numbered horizontal line of the RGB signal 320RGB with the third horizontal resolution; $G_{(m*2)}$, $G_{(m*2+1)}$ indicate respective green subpixels of the two pixels of the odd-numbered horizontal line from the RGB signal 640RGB with the second horizontal resolution; $\alpha_2$, $\beta_2$ indicate coefficients respectively corresponding to the green subpixels in the second low pass filtering step.

Step (B3) performs a third low pass filtering step expressed by the equation as follows:

$$B'_m = \alpha_1 \times B_{(m*2)} + \beta_1 \times B_{(m*2+1)} + \gamma_1 \times B_{(m*2+2)},$$

where m is an integer; $B'_m$ indicates a blue pixel of the odd-numbered horizontal line of the RGB signal 320RGB with the third horizontal resolution; $B_{(m*2)}$, $B_{(m*2+1)}$, $B_{(m*2+2)}$ indicate respective blue subpixels of the three pixels of the odd-numbered horizontal line from the RGB signal 640RGB with the second horizontal resolution; $\alpha_1$, $\beta_1$, $\gamma_1$ indicate coefficients respectively corresponding to the blue subpixels in the third low pass filtering step.

Step (B4) performs a fourth low pass filtering step expressed by the equation as follows:

$$R'_m = \alpha_1 \times R_{(m*2)} + \beta_1 \times R_{(m*2+1)} + \gamma_1 \times R_{(m*2+2)},$$

where m is an integer; $R'_m$ indicates a red pixel of the even-numbered horizontal line of the RGB signal 320RGB with the third horizontal resolution; $R_{(m*2)}$, $R_{(m*2+1)}$, $R_{(m*2+2)}$ indicate respective red subpixels of the three pixels of the even-numbered horizontal line from the RGB signal 640RGB with the second horizontal resolution; $\alpha_1$, $\beta_1$, $\gamma_1$ indicate coefficients respectively corresponding to the red subpixels in the fourth low pass filtering step.

Step (B5) performs a fifth low pass filtering step expressed by the equation as follows:

$$G'_m = \alpha_2 \times G_{(m*2-1)} + \beta_2 \times G_{(m*2)},$$

where m is an integer; $G'_m$ indicates a green pixel of the even-numbered horizontal line of the RGB signal 320RGB with the third horizontal resolution; $G_{(m*2-1)}$, $G_{(m*2)}$ indicate respective green subpixels of the two pixels of the even-numbered horizontal line from the RGB signal 640RGB with the second horizontal resolution; $\alpha_2$, $\beta_2$ indicate coefficients respectively corresponding to the green subpixels in the fifth low pass filtering step.

Step (B6) performs a sixth low pass filtering step expressed by the equation as follows:

$$B'_m = \alpha_1 \times B_{(m*2-1)} + \beta_1 \times B_{(m*2)} + \gamma_1 \times B_{(m*2+1)},$$

where m is an integer; $B'_m$ indicates a blue pixel of the even-numbered horizontal line of the RGB signal 320RGB with the third horizontal resolution; $B_{(m*2-1)}$, $B_{(m*2)}$, $B_{(m*2+1)}$ indicate respective blue subpixels of the three pixels of the even-numbered horizontal line from the RGB signal 640RGB with the second horizontal resolution; $\alpha_1$, $\beta_1$, $\gamma_1$ indicate coefficients respectively corresponding to the blue subpixels in the sixth low pass filtering step.

As cited, the issues of the pixel structure of delta panels and the half pixel dislocation between odd-numbered and even-numbered horizontal lines are not considered in the prior, resulting in causing the problems of zigzag edges, line deformation, and color fringing when an image is displayed on a delta panel.

In the invention, since the LPF mapper 750 performs a low pass filtering and mapping in view of the space pixel model of delta panels and the relationship between the pixel size of a delta panel and the pixel size of a strip panel, and the half pixel dislocation between odd-numbered and even-numbered horizontal lines, the prior problems of zigzag edges, line deformation, and color fringing can be avoided if an image is displayed on a delta panel, thereby improving the displayed frame quality.

Although the present invention has been explained in relation to its preferred embodiment, it is to be understood that many other possible modifications and variations can be made without departing from the spirit and scope of the invention as hereinafter claimed.

What is claimed is:

1. A pixel data conversion apparatus for display with delta panel arrangement, comprising:
    a first color domain converter, for converting an input video signal from a Red, Green and Blue (RGB) domain into a YCrCb domain to generate a first YCrCb signal;
    a determinator, connected to the first color domain converter, for determining a horizontal resolution of the first YCrCb signal based on a pixel size ratio, wherein a first enable signal is generated when the first YCrCb signal is a first horizontal resolution;
    a scaler, connected to the determinator, for scaling the first YCrCb signal to a second YCrCb signal with a second horizontal resolution when the first enable signal is activated;
    a second color domain converter connected to the determinator and the scaler, for converting the second YCrCb signal with the second horizontal resolution into an RGB signal with the second horizontal resolution, wherein the RGB signal with the second horizontal resolution is in a strip panel arrangement with a resolution of 640RGB× 480 that has 480 horizontal lines in one frame, with 640 pixels in each horizontal line and three subpixels in each pixel, which are red, green, and blue subpixels; and
    a low pass filtering mapper, connected to the second color domain converter, for filtering and mapping the RGB signal with the second horizontal resolution into an RGB signal with a third horizontal resolution, wherein the RGB signal with the third horizontal resolution is in a delta panel arrangement with a resolution of 320RGB× 480 that has 480 horizontal lines in one frame, with 960 pixels in each horizontal line, repeatedly arranged in a sequence of red, green, blue pixels for each odd-numbered horizontal line and in a sequence of green, blue, red pixels for each even-numbered horizontal line, and a position of each pixel in the even-numbered horizontal line has a half-pixel dislocation to a position of each pixel in the odd-numbered horizontal line;
    wherein the second horizontal resolution is K times the third horizontal resolution, where K is a positive integer.

2. The apparatus as claimed in claim 1, wherein a pixel size ratio is defined as a ratio of a pixel size of the delta panel to a pixel size of the strip panel, and the pixel size ratio is 2/3.

3. The apparatus as claimed in claim 2, wherein the second horizontal resolution is the third horizontal resolution multiplied by the pixel size ratio of 2/3 and then by three.

4. The apparatus as claimed in claim 1, wherein K is 2.

5. The apparatus as claimed in claim 1, wherein the low pass filtering mapper includes an odd horizontal line low pass filtering mapper and an even horizontal line low pass filtering mapper, such that the odd horizontal line low pass filtering mapper receives odd-numbered horizontal lines of the RGB signal with the second horizontal resolution and performs a low pass filtering and mapping on the odd-numbered horizontal lines to generate the odd-numbered horizontal lines from the RGB signal with the third horizontal resolution, and the even horizontal line low pass filtering mapper receives even-numbered horizontal lines from the RGB signal with the second horizontal resolution and performs the low pass filtering and mapping on the even-numbered horizontal lines to generate the even-numbered horizontal lines from the RGB signal with the third horizontal resolution.

6. The apparatus as claimed in claim 5, wherein the odd horizontal line low pass filtering mapper includes a first low pass filter, a second low pass filter, and a third low pass filter, such that the first low pass filter and the third low pass filter perform a low pass filtering based on three pixels of each odd-numbered horizontal line from the RGB signal with the second horizontal resolution to generate red and blue pixels of the odd-numbered horizontal line from the RGB signal with the third horizontal resolution, and the second low pass filter performs a low pass filtering based on two pixels of each odd-numbered horizontal line from the RGB signal with the second horizontal resolution to generate green pixels of the odd-numbered horizontal line from the RGB signal with the third horizontal resolution.

7. The apparatus as claimed in claim 6, wherein the first low pass filter is expressed as follows:

$$R'_m = \alpha_1 \times R_{(m*2-1)} + \beta_1 \times R_{m*2} + \gamma_1 \times R_{(m*2+1)},$$

where m is an integer, $R'_m$ indicates a red pixel of the odd-numbered horizontal line from the RGB signal with the third horizontal resolution, $R_{(m*2-1)}$, $R_{m*2}$, $R_{(m*2+1)}$ indicate respective red subpixels of the three pixels of the odd-numbered horizontal line from the RGB signal with the second horizontal resolution, and $\alpha_1$, $\beta_1$, $\gamma_1$ indicate coefficients of the first low pass filter corresponding to the red subpixels, respectively; the second low pass filter is expressed as follows:

$$G'_m = \alpha_2 \times G_{(m*2)} + \beta_2 \times G_{(m*2+1)},$$

where $G'_m$ indicates a green pixel of the odd-numbered horizontal line from the RGB signal with the third horizontal resolution, $G_{(m*2)}$, $G_{(m*2+1)}$ indicate respective green subpixels of the two pixels of the odd-numbered horizontal line from the RGB signal with the second horizontal resolution, and $\beta_2$, $\beta_2$ indicate coefficients of the second low pass filter corresponding to the green subpixels, respectively; the third low pass filter is expressed as follows:

$$B'_m = \alpha_1 \times B_{(m*2)} + \beta_1 \times B_{(m*2+1)} + \gamma_1 \times B_{(m*2+2)},$$

where $B'_m$ indicates a blue pixel of the odd-numbered horizontal line of the RGB signal with the third horizontal resolution, $B_{(m*2)}$, $B_{(m*2+1)}$, $B_{(m*2+2)}$ indicate respective blue subpixels of the three pixels of the odd-numbered horizontal line from the RGB signal with the second horizontal resolution, and $\alpha_1, \beta_1, \gamma_1$ indicate coefficients of the third low pass filter corresponding to the blue subpixels, respectively.

8. The apparatus as claimed in claim 5, wherein the even horizontal line low pass filtering mapper includes a fourth low pass filter, a fifth low pass filter, and a sixth low pass filter, such that the fourth low pass filter and the sixth low pass filter perform a low pass filtering based on three pixels of each even-numbered horizontal line of the RGB signal with the second horizontal resolution to generate red and blue pixels of the even-numbered horizontal line of the RGB signal with the third horizontal resolution, and the fifth low pass filter performs a low pass filtering based on two pixels of each even-numbered horizontal line of the RGB signal with the second horizontal resolution to generate green pixels of the even-numbered horizontal line of the RGB signal with the third horizontal resolution.

9. The apparatus as claimed in claim 8, wherein the fourth low pass filter is expressed as follows:

$$R'_m = \alpha_1 \times R_{(m*2-1)} + \beta_1 \times R_{m*2} + \gamma_1 \times R_{(m*2+1)},$$

where m is an integer, $R'_m$ indicates a red pixel of the even-numbered horizontal line of the RGB signal with the third horizontal resolution, $R_{(m*2)}$, $R_{(m*2+1)}$, $R_{(m*2+2)}$ indicate respective red subpixels of the three pixels of the even-numbered horizontal line from the RGB signal with the second horizontal resolution, and $\alpha_1, \beta_1, \gamma_1$ indicate coefficients of the fourth low pass filter corresponding to the red subpixels, respectively; the fifth low pass filter is expressed as follows:

$$G'_m = \alpha_2 \times G_{(m*2)} + \beta_2 \times G_{(m*2+1)},$$

where m is an integer, $G'_m$ indicates a green pixel of the even-numbered horizontal line of the RGB signal with the third horizontal resolution, $G_{(m*2-1)}$, $G_{(m*2)}$ indicate respective green subpixels of the two pixels of the even-numbered horizontal line from the RGB signal with the second horizontal resolution, and $\alpha_2, \beta_2$ indicate coefficients of the fifth low pass filter corresponding to the green subpixels, respectively; the sixth low pass filter ist expressed as follows:

$$B'_m = \alpha_1 \times B_{(m*2-1)} + \beta_1 \times B_{(m*2)} + \gamma_1 \times B_{(m*2+2)},$$

where m is an integer, $B'_m$ indicates a blue pixel of the even-numbered horizontal line of the RGB signal with the third horizontal resolution, $B_{(m*2-1)}$, $B_{(m*2)}$, $B_{(m*2+1)}$ indicate respective blue subpixels of the three pixels of the even-numbered horizontal line from the RGB signal with the second horizontal resolution, and $\beta_1, \beta_1, \gamma 1$ indicate coefficients of the sixth low pass filter corresponding to the blue subpixels, respectively.

10. The apparatus as claimed in claim 1, wherein the first YCrCb signal has a format of 720YCrCb444, 720YCrCb422, 640YCrCb444, or 640YCrCb422.

11. The apparatus as claimed in claim 10, wherein, when the first YCrCb signal is in the 720YCrCb444 or 720YCrCb422 format, the scaler is enabled and expressed as follows:

$$Y'_k = Y_{k/8*9},$$

$$Y'_{k+1} = \tfrac{7}{8}*Y_{(k/8*9+1)} + \tfrac{1}{8}*Y_{(k/8*9+2)},$$

$$Y'_{k+2} = \tfrac{6}{8}*Y_{(k/8*9+2)} + \tfrac{2}{8}*Y_{(k/8*9+3)},$$

$$Y'_{k+3} = \tfrac{5}{8}*Y_{(k-8*9+3)} + \tfrac{3}{8}*Y_{(k/8*9+4)},$$

$$Y'_{k+4} = \tfrac{4}{8}*Y_{(k/8*9+4)} + \tfrac{4}{8}*Y_{(k/8*9+5)},$$

$$Y'_{k+5} = \tfrac{3}{8}*Y_{(k/8*9+5)} + \tfrac{5}{8}*Y_{(k/8*9+6)},$$

$$Y'_{k+6} = \tfrac{2}{8}*Y_{(k/8*9+6)} + \tfrac{6}{8}*Y_{(k/8*9+7)}, \text{ and}$$

$$Y'_{k+7} = \tfrac{1}{8}*Y_{(k/8*9+7)} + \tfrac{7}{8}*Y_{(k/8*9+8)},$$

where k is eight times an integer, $Y_{k/8*9}$, $Y_{(Y_{k/8*9}+1)}$, $Y_{(Y_{k/8*9}+2)}$, $Y_{(Y_{k/8*9}+3)}$, $Y_{(Y_{k/8*9}+4)}$, $Y_{(Y_{k/8*9}+5)}$, $Y_{(Y_{k/8*9}+6)}$, $Y_{(Y_{k/8*9}+7)}$, $Y_{(Y_{k/8*9}+4)}$ are lumas of the first YCrCb signal, and $Y'_k, Y'_{k+1}, Y'_{k+2}, Y'_{k+3}, Y'_{k+4}, Y'_{k+5}, Y'_{k+6}, Y'_{k+7}$ are lumas of the second YCrCb signal with the second horizontal resolution.

12. The apparatus as claimed in claim 11, wherein the scaler is further expressed as follows:

$$Cb'_k = Cb_{k/8*9},$$

$$Cb'_{k+1} = \tfrac{7}{8}*Cb_{(k/8*9+1)} + \tfrac{1}{8}*Cb_{(k/8*9+2)},$$

$$Cb'_{k+2} = \tfrac{6}{8}*Cb_{(k/8*9+2)} + \tfrac{2}{8}*Cb_{(k/8*9+3)},$$

$$Cb'_{k+3} = \tfrac{5}{8}*Cb_{(k/8*9+3)} + \tfrac{3}{8}*Cb_{(k/8*9+4)},$$

$$Cb'_{k+4} = \tfrac{4}{8}*Cb_{(k/8*9+4)} + \tfrac{4}{8}*Cb_{(k/8*9+)},$$

$$Cb'_{k+5} = \tfrac{3}{8}*Cb_{(k/8*9+5)} + \tfrac{5}{8}*Cb_{(k/8*9+6)},$$

$$Cb'_{k+6} = \tfrac{2}{8}*Cb_{(k/8*9+6)} + \tfrac{6}{8}*Cb_{(k/8*9+7)}, \text{ and}$$

$$Cb'_{k+7} = \tfrac{1}{8}*Cb_{(k/8*9+7)} + \tfrac{7}{8}*Cb_{(k/8*9+8)},$$

where k is eight times an integer, $Cb_{k/8*9}$, $Cb_{(Y_{k/8*9}+1)}$, $Cb_{(Y_{k/8*9}+2)}$, $Cb_{(Y_{k/8*9}+3)}$, $Cb_{(Y_{k/8*9}+4)}$, $Cb_{(Y_{k/8*9}+5)}$, $Cb_{(Y_{k/8*9}+6)}$, $Cb_{(Y_{k/8*9}+7)}$, $Cb_{(Y_{k/8*9}+8)}$ are chromas of the first YCrCb signal, and $Cb'_k, Cb'_{k+1}, Cb'_{k+2}, Cb'_{k+3}, Cb'_{k+4}, Cb'_{k+5}, Cb'_{k+6}, Cb'_{k+7}$ are chromas of the second YCrCb signal with the second horizontal resolution; and $$Cr'_k = Cr_{k/8*9},$$

$$Cr'_{k+1} = \tfrac{7}{8}*Cr_{(k/8*9+1)} + \tfrac{1}{8}*Cr_{(k/8*9+2)},$$

$$Cr'_{k+2} = \tfrac{6}{8}*Cr_{(k/8*9+2)} + \tfrac{2}{8}*Cr_{(k/8*9+3)},$$

$$Cr'_{k+3} = \tfrac{5}{8}*Cr_{(k/8*9+3)} + \tfrac{3}{8}*Cr_{(k/8*9+4)},$$

$$Cr'_{k+4} = \tfrac{4}{8}*Cr_{(k/8*9+4)} + \tfrac{4}{8}*Cr_{(k/8*9+5)},$$

$$Cr'_{k+5} = \tfrac{3}{8}*Cr_{(k/8*9+5)} + \tfrac{5}{8}*Cr_{(k/8*9+6)},$$

where k is eight times an integer, $Cr_{k/8*9}$, $Cr_{(Y_{k/8*9}+1)}$, $Cr_{(Y_{k/8*9}+2)}$, $Cr_{(Y_{k/8*9}+3)}$, $Cr_{(Y_{k/8*9}+4)}$, $Cr_{(Y_{k/8*9}+5)}$, $Cr_{(Y_{k/8*9}+6)}$, $Cr_{(Y_{k/8*9}+7)}$, $Cr_{(Y_{k/8*9}+8)}$ are chromas of the first YCrCb signal, and $Cr'_k, Cr'_{k+1}, Cr'_{k+2}, Cr'_{k+3}, Cr'_{k+4}, Cr'_{k+5}, Cr'_{k+6}, Cr'_{k+7}$ are chromas of the second YCrCb signal with the second horizontal resolution.

13. The apparatus as claimed in claim 12, wherein if the first YCrCb signal is in the 720YCrCb422 format, the first YCrCb signal includes chromas expressed by $Cb_{2*w} = Cb_{2*w+1}$ and $Cr_{2*w} = Cr_{2*w+1}$, where w is an integer and $w \geq 0$.

14. A pixel data conversion method applied in a handheld device for display with delta panel arrangement, comprising the steps of: (A) converting an input video signal from a Red, Green and Blue (RGB) RGB domain into a YCrCb domain so as to generate a first YCrCb signal;
  (B) determining a horizontal resolution of the first YCrCb signal, and generating a first enable signal when the first YCrCb signal is a first horizontal resolution;
  (C) scaling the first YCrCb signal to a second YCrCb signal with a second horizontal resolution when the first enable signal is activated;
  (D) converting the second YCrCb signal with the second horizontal resolution into an RGB signal with the second horizontal resolution, wherein the RGB signal with the second horizontal resolution is in a strip panel arrangement with a resolution of 640RGBx480 that has 480 horizontal lines in one frame, with 640 pixels in each horizontal line and three subpixels in each pixel, which are red, green, and blue subpixels; and
  (E) filtering and mapping the RGB signal with the second horizontal resolution into an RGB signal with a third horizontal resolution, wherein the RGB signal with the third horizontal resolution is in a delta panel arrangement with a resolution of 320RGBx480 that has 480 horizontal lines in one frame, with 960 pixels in each horizontal line, repeatedly arranged in a sequence of red, green, blue pixels for each odd-numbered horizontal line and in a sequence of green, blue, red pixels for each even-numbered horizontal line, wherein a position of each pixel in an even-numbered horizontal line has a half-pixel dislocation to a position of each pixel in an odd-numbered horizontal line.

15. The method as claimed in claim 14, wherein step (E) comprises the steps of:
  (E1) performing a first low pass filtering expressed by an equation as follows:

$$R'_m = \alpha_1 \times R_{(m*2-1)} + \beta_1 \times R_{m*2} + \gamma_1 \times R_{(m*2+1)},$$

where m is an integer, $R'_m$ indicates a red pixel of the odd-numbered horizontal line from the RGB signal with the third horizontal resolution, $R_{(m*2-1)}$, $R_{m*2}$, $R_{(m*2+1)}$ indicate respective red subpixels of three pixels of the odd-numbered horizontal line from the RGB signal with the second horizontal resolution, and $\alpha_1, \beta_1, \gamma_1$ indicate coefficients respectively corresponding to the red subpixels in the first low pass filtering;
  (E2) performing a second low pass filtering expressed by an equation as follows:

$$G'_m = \alpha_2 \times G_{(m*2)} + \beta_2 \times G_{(m*2+1)},$$

where $G'_m$ indicates a green pixel of the odd-numbered horizontal line of the RGB signal with the third horizontal resolution, $G_{(m*2)}$, $G_{(m*2+1)}$ indicate respective green subpixels of two pixels of the odd-numbered horizontal line from the RGB signal with the second horizontal resolution, and $\alpha_2, \beta_2$ indicate coefficients respectively corresponding to the green subpixels in the second low pass filtering; and
  (E3) performing a third low pass filtering expressed by an equation as follows:

$$B'_m = \alpha_1 \times B_{(m*2)} + \beta_1 \times B_{(m*2+1)} + \gamma_1 \times B_{(m*2+2)},$$

where $B'_m$ indicates a blue pixel of the odd-numbered horizontal line of the RGB signal with the third horizontal resolution, $B_{(m*2)}$, $B_{(m*2+1)}$, $B_{(m*2+2)}$ indicate respective blue subpixels of the three pixels of the odd-numbered horizontal line from the RGB signal with the second horizontal resolution, and $\alpha_1, \beta_1, \gamma_1$ indicate coefficients respectively corresponding to the blue subpixels in the third low pass filtering.

16. The method as claimed in claim 15, wherein step (E) further comprises the steps of:

(E4) performing a fourth low pass filtering expressed by an equation as follows:

$$R'_m = \alpha_1 \times R_{(m*2)} + \beta_1 \times R_{(m*2+1)} + \gamma_1 \times R_{(m*2+2)},$$

where m is an integer, $R'_m$ indicates a red pixel of the even-numbered horizontal line of the RGB signal with the third horizontal resolution, $R_{(m*2)}$, $R_{(m*2+1)}$, $R_{(m*2+2)}$ indicate respective red subpixels of the three pixels of the even-numbered horizontal line from the RGB signal with the second horizontal resolution, and $\alpha_1, \beta_1, \gamma_1$ indicate coefficients respectively corresponding to the red subpixels in the fourth low pass filtering;
  (E5) performing a fifth low pass filtering expressed by an equation as follows:

$$G'_m = \alpha_2 \times G_{(m*2-1)} + \beta_2 \times G_{(m*2)},$$

where m is an integer, $G'_m$ indicates a green pixel of the even-numbered horizontal line of the RGB signal with the third horizontal resolution, $G_{(m*2-1)}$, $G_{(m*2)}$ indicate respective green subpixels of the two pixels of the even-numbered horizontal line from the RGB signal with the second horizontal resolution, and $\alpha_2, \beta_2$ indicate coefficients respectively corresponding to the green subpixels in the fifth low pass filtering; and
  (E6) performing a sixth low pass filtering expressed by an equation as follows:

$$B'_m = \alpha_1 \times B_{(m*2-1)} + \beta_1 \times B_{(m*2)} + \gamma_1 \times B_{(m*2+1)},$$

where m is an integer, $B'_m$ indicates a blue pixel of the even-numbered horizontal line of the RGB signal with the third horizontal resolution, $B_{(m*2-1)}$, $B_{(m*2)}$, $B_{(m*2+1)}$ indicate respective blue subpixels of the three pixels of the even-numbered horizontal line from the RGB signal with the second horizontal resolution, and $\alpha_1, \beta_1, \gamma_1$ indicate coefficients respectively corresponding to the blue subpixels in the sixth low pass filtering.

17. The method as claimed in claim 14, wherein the first YCrCb signal has a format of 720YCrCb444, 720YCrCb422, 640YCrCb444, or 640YCrCb422.

18. The method as claimed in claim 17, wherein, when the first YCrCb signal is in the 720YCrCb444 or 720YCrCb422 format, the scaling in step (C) is expressed as follows:

$$Y'_k = Y_{k/8*9},$$

$$Y'_{k+1} = 7/8 * Y_{(k/8*9+1)} + 1/8 * Y_{(k/8*9+2)},$$

$$Y'_{k+2} = 6/8 * Y_{(k/8*9+2)} + 2/8 * Y_{(k/8*9+3)},$$

$$Y'_{k+3} = 5/8 * Y_{(k-8*9+3)} + 3/8 * Y_{(k/8*9+4)},$$

$$Y'_{k+4} = 4/8 * Y_{(k/8*9+4)} + 4/8 * Y_{(k/8*9+5)},$$

$$Y'_{k+5} = 3/8 * Y_{(k/8*9+5)} + 5/8 * Y_{(k/8*9+6)},$$

$$Y'_{k+6} = 2/8 * Y_{(k/8*9+6)} + 6/8 * Y_{(k/8*9+7)}, \text{ and}$$

$$Y'_{k+7} = 1/8 * Y_{(k/8*9+7)} + 7/8 * Y_{(k/8*9+8)},$$

where k is eight times an integer, preferably k=0, 8, 16, 24, . . . , $Y_{k/8*9}$, $Y_{(Y_{k/8*9}+1)}$, $Y_{(Y_{k/8*9}+2)}$, $Y_{(Y_{k/8*9}+3)}$, $Y_{(Y_{k/8*9}+4)}$, $Y_{(Y_{k/8*9}+5)}$, $Y_{(Y_{k/8*9}+6)}$, $Y_{(Y_{k/8*9}+7)}$, $Y_{(Y_{k/8*9}+8)}$ are lumas of the first YCrCb signal, and $Y'_k$, $Y'_{k+1}$, $Y'_{k+2}$, $Y'_{k+3}$, $Y'_{k+4}$, $Y'_{k+5}$, $Y'_{k+6}$, $Y'_{k+7}$ are lumas of the second YCrCb signal with the second horizontal resolution; and $$Cb'_k = Cb_{k/8*9},$$

$$Cb'_{k+1} = 7/8 * Cb_{(k/8*9+1)} + 1/8 * Cb_{(k/8*9+2)},$$

$$Cb'_{k+2} = 6/8 * Cb_{(k/8*9+2)} + 2/8 * Cb_{(k/8*9+3)},$$

$Cb'_{k+3} = \frac{5}{8}*Cb_{(k/8*9+3)} + \frac{3}{8}*Cb_{(k/8*9+4)}$, $Cb'_{k+4} = \frac{4}{8}*Cb_{(k/8*9+4)} + \frac{4}{8}*Cb_{(k/8*9+5)}$, $Cb'_{k+5} = \frac{3}{8}*Cb_{(k/8*9+5)} + \frac{5}{8}*Cb_{(k/8*9+6)}$, $Cb'_{k+6} = \frac{2}{8}*Cb_{(k/8*9+6)} + \frac{6}{8}*Cb_{(k/8*9+7)}$, and $Cb'_{k+7} = \frac{1}{8}*Cb_{(k/8*9+7)} + \frac{7}{8}*Cb_{(k/8*9+8)}$, where k is eight times an integer, $Cb_{k/8*9}$, $Cb_{(Y_{k/8*9}+1)}$, $Cb_{(Y_{k/8*9}+2)}$, $Cb_{(Y_{k/8*9}+3)}$, $Cb_{(Y_{k/8*9}+4)}$, $Cb_{(Y_{k/8*9}+5)}$, $Cb_{(Y_{k/8*9}+6)}$, $Cb_{(Y_{k/8*9}+7)}$, $Cb_{(Y_{k/8*9}+8)}$ are chromas of the first YCrCb signal, and $Cb'_k$, $Cb'_{k+1}$, $Cb'_{k+2}$, $Cb'_{k+3}$, $Cb'_{k+4}$, $Cb'_{k+5}$, $Cb'_{k+6}$, $Cb'_{k+7}$ are chromas of the second YCrCb signal with the second horizontal resolution; and $Cr'_k = Cr_{k/8*9}$, $Cr'_{k+1} = \frac{7}{8}*Cr_{(k/8*9+1)} + \frac{1}{8}*Cr_{(k/8*9+2)}$, $Cr'_{k+2} = \frac{6}{8}*Cr_{(k/8*9+2)} + \frac{2}{8}*Cr_{(k/8*9+3)}$, $Cr'_{k+3} = \frac{5}{8}*Cr_{(k/8*9+3)} + \frac{3}{8}*Cr_{(k/8*9+4)}$, $Cr'_{k+4} = \frac{4}{8}*Cr_{(k/8*9+4)} + \frac{4}{8}*Cr_{(k/8*9+5)}$, $Cr'_{k+5} = \frac{3}{8}*Cr_{(k/8*9+5)} + \frac{5}{8}*Cr_{(k/8*9+6)}$, $Cr'_{k+6} = \frac{2}{8}*Cr_{(k/8*9+6)} + \frac{6}{8}*Cr_{(k/8*9+7)}$, and $Cr'_{k+7} = \frac{1}{8}*Cr_{(k/8*9+7)} + \frac{7}{8}*Cr_{(k/8*9+8)}$, where k is eight times an integer, $Cr_{k/8*9}$, $Cr_{(Y_{k/8*9}+1)}$, $Cr_{(Y_{k/8*9}+2)}$, $Cr_{(Y_{k/8*9}+3)}$, $Cr_{(Y_{k/8*9}+4)}$, $Cr_{(Y_{k/8*9}+5)}$, $Cr_{(Y_{k/8*9}+6)}$, $Cr_{(Y_{k/8*9}+7)}$, $Cr_{(Y_{k/8*9}+8)}$ are chromas of the first YCrCb signal, and $Cr'_k$, $Cr'_{k+1}$, $Cr'_{k+2}$, $Cr'_{k+3}$, $Cr'_{k+4}$, $Cr'_{k+5}$, $Cr'_{k+6}$, $Cr'_{k+7}$ are chromas of the second YCrCb signal with the second horizontal resolution.

19. The method as claimed in claim 18, wherein, if the first YCrCb signal is in the 720YCrCb422 format, the first YCrCb signal includes chromas expressed by $Cb_{2*w} = Cb_{2*w+1}$ and $Cr_{2*w} = Cr_{2*w\pm1}$, where w is an integer and $w \geq 0$.

\* \* \* \* \*